United States Patent [19]
Guenter et al.

[11] Patent Number: 6,072,496
[45] Date of Patent: Jun. 6, 2000

[54] METHOD AND SYSTEM FOR CAPTURING AND REPRESENTING 3D GEOMETRY, COLOR AND SHADING OF FACIAL EXPRESSIONS AND OTHER ANIMATED OBJECTS

[75] Inventors: Brian Guenter, Redmond; Cindy Marie Grimm, Seattle; Henrique Sarmento Malvar, Redmond, all of Wash.

[73] Assignee: Microsoft Corporation, Redmond, Wash.

[21] Appl. No.: 09/093,590

[22] Filed: Jun. 8, 1998

[51] Int. Cl.[7] .................................................. G06F 15/00
[52] U.S. Cl. .................................................. 345/419
[58] Field of Search ................................... 345/419, 420, 345/421, 422, 423, 424

[56] References Cited

U.S. PATENT DOCUMENTS 5,524,187  6/1996  Feiner et al. ............................ 345/419
5,675,720  10/1997  Sato et al. ............................... 345/420

OTHER PUBLICATIONS

M. Proesmans, L. Van Gool, A. Oosterlinck; "One–Shot Active 3D Shape Acquisition", Proceedings 13th IAPR International Conference on Pattern Recognition: Applications & Robotic Systems, IEEE, 1996.

Christoph Bregler, Michele Covell, Malcolm Slaney; "Video Rewrite: Driving Visual Speech with Audio", *Computer Graphics*, Annual Conference Series 1997.

Yuencheng Lee, Demetri Terzopoulos, Keith Waters; "Realistic Modeling for Facial Animation", *Computer Graphics*, Annual Conference Series 1995.

Frederic Pighin, Joel Auslander, Dani Lischinski, David H. Salesin, Richard Szeliski; "Realistic Facial Animation Using Image–Based 3D Morphing", University of Washington, Technical Report, May 6, 1997.

Keith Waters; "A Muscle Model for Animating Three–Dimensional Facial Expression", *Computer Graphics*, vol. 21, No. 4, Jul. 1987.

Lance Williams; "Performance–Driven Facial Animation", *Computer Graphics*, vol. 24, No. 4, Aug. 1990.

*Primary Examiner*—Phu K. Nguyen
*Attorney, Agent, or Firm*—Klarquist Sparkman Campbell Leigh & Whinston LLP

[57] ABSTRACT

The method captures a 3D model of a face, which includes a 3D mesh and a series of deformations of the mesh that define changes in position of the mesh over time (e.g., for each frame). The method also builds a texture map associated with each frame in an animation sequence. The method achieves significant advantages by using markers on an actor's face to track motion of the face over time and to establish a relationship between the 3D model and texture. Specifically, videos of an actor's face with markers are captured from multiple cameras. Stereo matching is used to derive 3D locations of the markers in each frame. A 3D scan is also performed on the actor's face with the markers to produce an initial mesh with markers. The markers from the 3D scan are matched with the 3D locations of the markers in each frame from the stereo matching process. The method determines how the position of the mesh changes from frame to frame by matching the 3D locations of the markers from one frame to the next. The method derives textures for each frame by removing the dots from the video data, finding a mapping between texture space and the 3D space of the mesh, and combining the camera views for each frame into a signal texture map. The data needed to represent facial animation includes: 1) an initial 3D mesh, 2) 3D deformations of the mesh per frame, and 3) a texture map associated with each deformation. The method compresses 3D geometry by decomposing the deformation data into basis vectors and coefficients. The method compresses the textures using video compression.

28 Claims, 17 Drawing Sheets

(4 of 17 Drawing Sheet(s) Filed in Color)

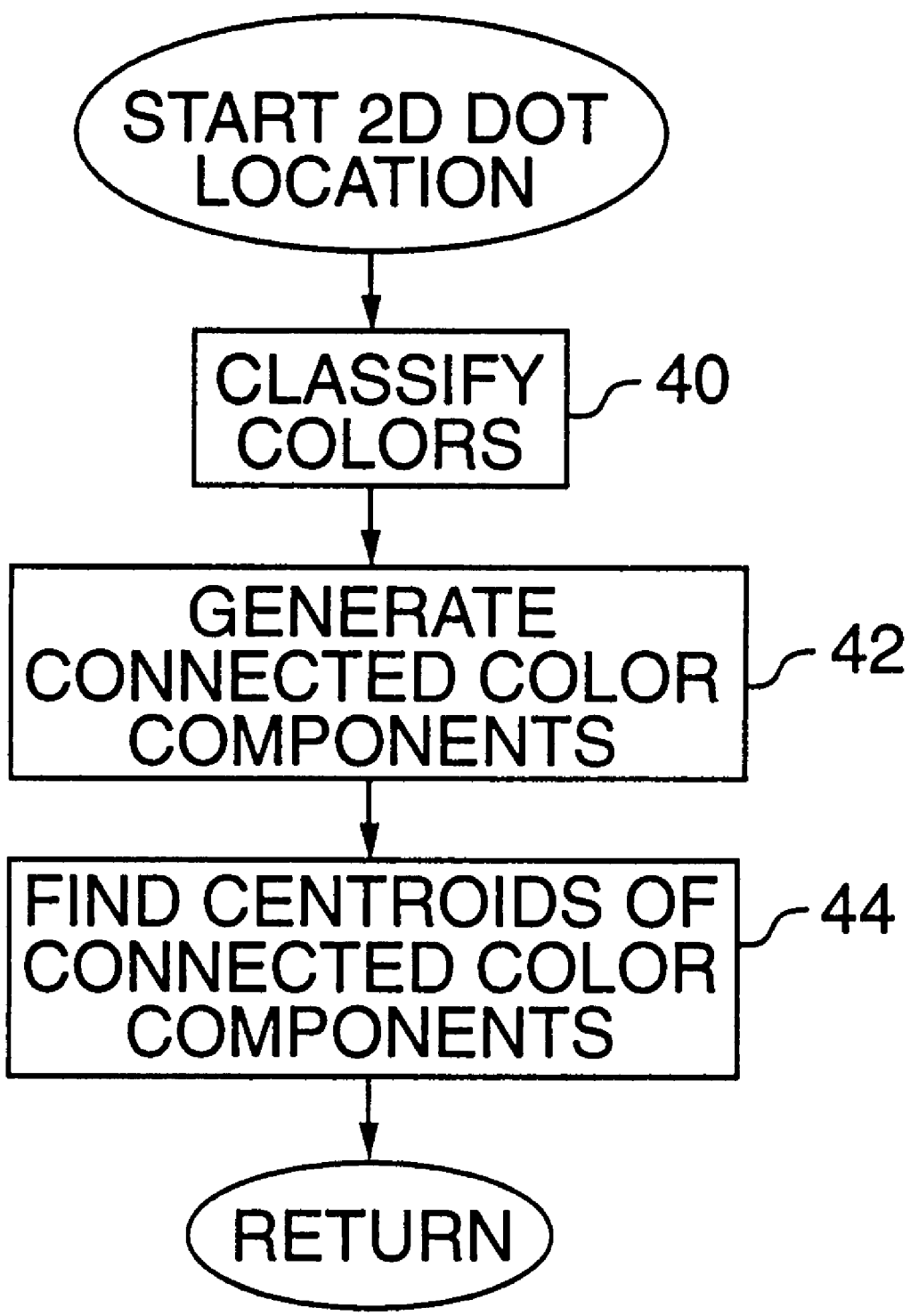

● REFERENCE DOT
□ 3D DOT

CONNECTED
COMPONENT
OF EDGE GRAPH

● REFERENCE DOT
□ 3D DOT

SORT AND PAIR

● REFERENCE DOT
□ 3D DOT

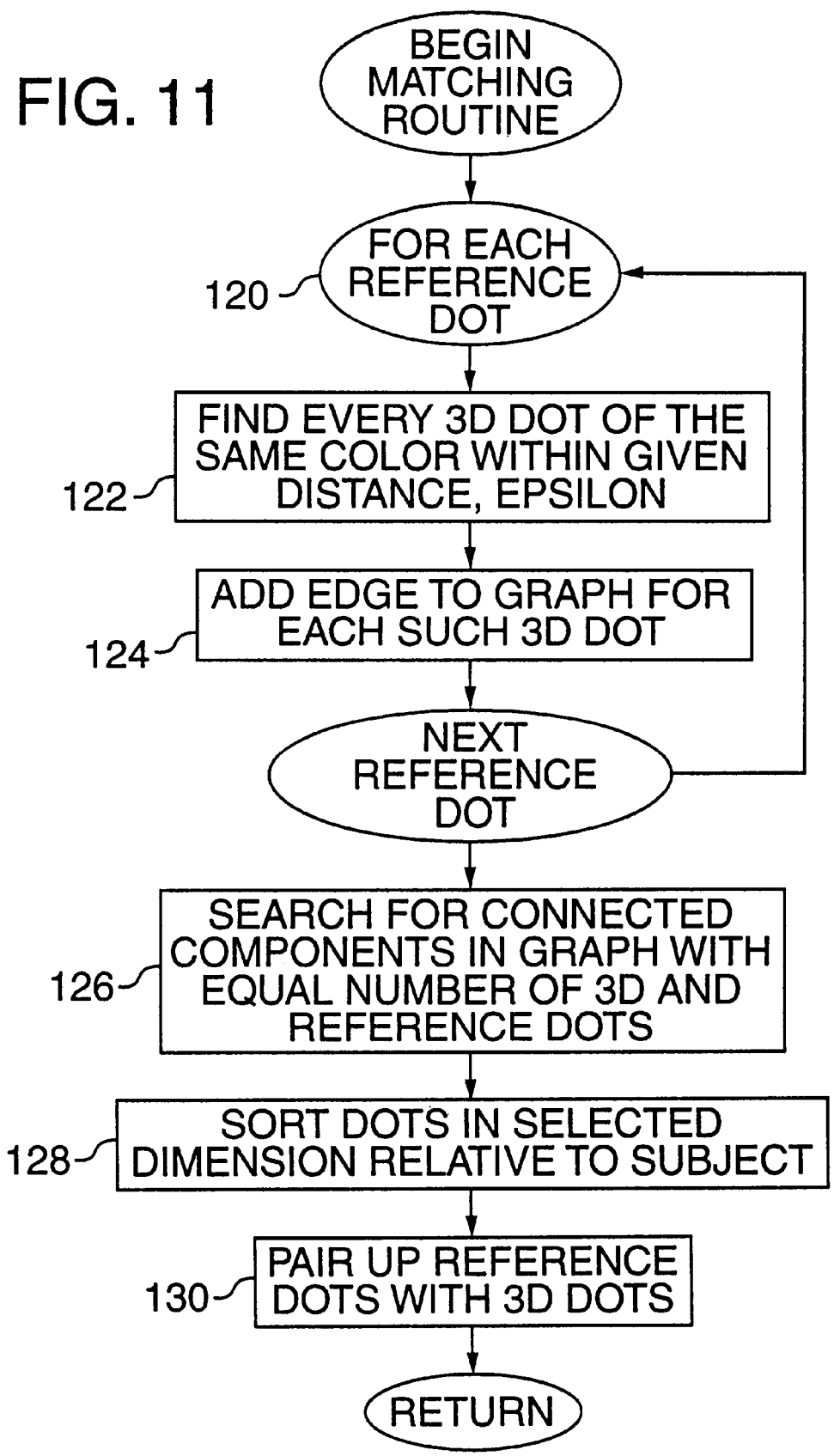

FIG. 24A
FIG. 24B
FIG. 25A
FIG. 25B
FIG. 25C
FIG. 25D

METHOD AND SYSTEM FOR CAPTURING AND REPRESENTING 3D GEOMETRY, COLOR AND SHADING OF FACIAL EXPRESSIONS AND OTHER ANIMATED OBJECTS

FIELD OF THE INVENTION

The invention relates to 3D animation, and in particular, relates to a method for capturing a computer model of animated 3D objects, such as a human facial expressions.

BACKGROUND OF THE INVENTION

A constant pursuit in the field of computer animation is to enhance the realism of computer generated images. A related goal is to develop techniques for creating 3D models of real, moving objects that accurately represent the color and shading of the object and the changes in the object's appearance as it moves over time.

One of the most elusive goals in computer animation has been the realistic animation of the human face. Possessed of many degrees of freedom and capable of deforming in many ways, the face has been difficult to simulate accurately enough to pass the animation Turing test—fooling the average person into thinking a piece of computer animation is actually an image of a real person.

Examples of previous work in facial animation are discussed in Lee, Y., Terzopoulos, D., and Waters, K., "Realistic modeling for facial animation". *Computer Graphics* 29, 2(July 1995), 55–62; Waters, K., "A muscle model for animating three-dimensional facial expression," in *Computer Graphics (SIGGRAPH '87 Proceedings)*(July 1987), M. C. Stone, Ed., vol. 21, pp. 17–24; and Cassell, J., Pelachaud, C., Badler, N., Steedman, M., Achom, B., Becket, T., Douville, B., Prevost, S., and Stone, M., "Animated conversation: Rule-based generation of facial expression, gesture and spoken intonation for multiple conversational agents," *Computer Graphics* 28, 2(Aug. 1994), 413–420. These approaches use a synthetic model of facial action or structure, rather than deriving motion from real data. The systems of Lee et al. and Waters et al. are designed to make it relatively easy to animate facial expression manually. The system of Badler et al. is designed to create a dialog automatically rather than faithfully reconstruct a particular person's facial expression.

Other examples of facial animation include work by Williams and Bregler et al. See Williams, L., "Performance-driven facial animation" *Computer Graphics* 24, 2(Aug. 1990), 235–242 and paper by Bregler, T., and Neely, S., "Feature-based image metamorphosis" in *Computer Graphics (SIGGRAPH '92 Proceedings)*(July 1992), E. E. Catmull, Ed., vol. 26, pp. 35–42. Williams uses a single static texture image of a real person's face and tracks points only in 2D. Bregler et al. use speech recognition to locate "visemes" in a video of a person talking and then synthesize new video, based on the original video sequence, for the mouth and jaw region of the face to correspond with synthetic utterances. The visual analog of phonemes, a "visemes" consist of the shape and placement of the lips, tongue, and teeth that correspond to a particular phoneme. Bregler et al. do not create a three dimensional face model, nor do they vary the expression on the remainder of the face.

An important part of creating realistic facial animation involves the process of capturing an accurate 3D model. However, capturing an accurate 3D model solves only part of the problem—the color, shading, and shadowing effects still need to be captured as well. Proesmans et al. have proposed a one-shot 3D acquisition system for animated objects that can be applied to a human face. See Proesmans, M., Van Gool, L., and Oosterlinck, A., "One-Shot Active 3d Shape Acquisition," Proceedings 13$^{th}$ *IAPR International Conference on Pattern Recognition*, Aug. 25–26, 1996, vol. III C, pp. 336–340. Their approach uses a slide projector that projects a regular pattern on a moving object. The pattern is detected in each image of a video sequence taken of the moving object with the pattern applied to it. The shape of the moving object is then derived from the detected pattern by assuming a pseudo-orthographic projection of the pattern on the object.

Though prior attempts have made strides, more effective methods are needed to create realistic and efficient models of the complex structure, color, and shading of facial expressions and other complex real world objects.

SUMMARY OF THE INVENTION

The invention provides a method and system for capturing 3D geometric motion and shading of a complex, animated 3D object. The method is particularly designed for capturing and representing facial expressions, but can be adapted for other forms of animation as well.

An initial implementation of the method creates a realistic 3D model of human facial expressions, including a base 3D model, sets of deformation vectors used to move the base model, and a series of texture maps. The method begins by applying reference markers to a human face. Next, a live video sequence is captured simultaneously through multiple cameras. The base 3D model is also captured using a 3D scanner. The 3D positions of the reference markers are determined by identifying them in the camera images for each frame of video and determining the correspondence among them. After identifying the 3D positions, the method tracks the 3D motion of the markers over time by determining their frame to frame correspondence.

The initial implementation creates an accurate model of shading by computing textures from the video data. The 3D position data is used to compute the texture for each frame of a multiple frame sequence such that each texture is associated with a set of 3D positions. The resulting model includes sets of 3D motion data that deform the base mesh, and a texture map corresponding to each deformation.

The geometric motion and texture data can be compressed for more efficient transmission and storage. The initial implementation compresses the geometric motion data by decomposing a matrix of deformation vectors into basis vectors and coefficients. It also compresses the textures by treating them as a sequence of video frames and using video coding to compress them.

The method summarized above can be used to capture and reconstruct human facial expression with 3D polygonal face model of low complexity, e.g., only 4800 polygons. The resulting animation comes very close to passing the Turing test. The method can be used in a variety of applications. For example, the method can be used to create believable virtual charaters for movie and television. The processes used to represent facial expressions can be used as a form of video compression. For instance, facial animation can be captured in a studio, delivered via a CDROM or the internet to a user, and then reconstructed in real time on a user's computer in a virtual 3D environment. The user can select any arbitrary position for the face, any virtual camera viewpoint, and render the result at any size.

The above approach can be used to generate accurate 3D deformation information and texture image data that is precisely registered from frame to frame. Since the textures are associated with an accurate 3D model of the subject's face as it moves over time, most of the variation in image intensity due to geometric motion is eliminated, leaving primarily shading and self-shadowing effects. These effects tend to be of low spatial frequency and can be compressed very efficiently. In tests of the system, the compressed animation looks realistic at data rates of 240 kbits/sec for texture image sizes of 512×512 pixels, updating at 30 frames per second.

Further advantages and features of the invention will become apparent in the following detailed description and accompanying drawings.

BRIEF DESCRIPTION OF THE DRAWINGS

FIG. 3 is a flow diagram illustrating a method for computing the 2D locations of reference markers applied to the actor's face for the test case video sequences.

FIG. 11 illustrates steps in a matching routine used to match reference dots with neighboring reference dots in a different frame.

FIG. 12A shows an example of the results generated by the matching routine for small and large values of epsilon, a distance used to determine how far the matching routine searches for a possible matching 3D dot. FIG. 12B shows a special case where there is a missing 3D dot for small and large epsilon values. Finally, 12C shows the case where there is an extra 3D dot, for small and large epsilon values.

FIG. 20A shows an image of a portion of the face with dots. FIG. 20B shows the same image with the dots replaced by a low frequency skin texture. FIG. 20C shows an image with a high frequency texture added. Finally, FIG. 20D shows the image with the hue clamped to remove diffuse interreflection effects.

FIGS. 24A and 24B show examples of camera views of the face and their corresponding texture maps for the test case to show the similarities in the texture maps, even for frames widely separated in time. Specifically, FIG. 24A shows a camera image and its corresponding texture map for frame No. 451, and Fig. shows a camera image and its corresponding texture map for frame No. 1303.

FIGS. 25A–D show camera views and their corresponding textures for frame Nos. 0, 1000, 2000, and 3000, respectively, in the test case.

DETAILED DESCRIPTION

Introduction

The following sections describe an implementation of a method for capturing both the three-dimensional geometry and shading information for human facial expressions. While this method is described in the specific context of animating facial expression, the same concepts can be applied to capture a realistic model of other complex, animated objects.

Figure 1:
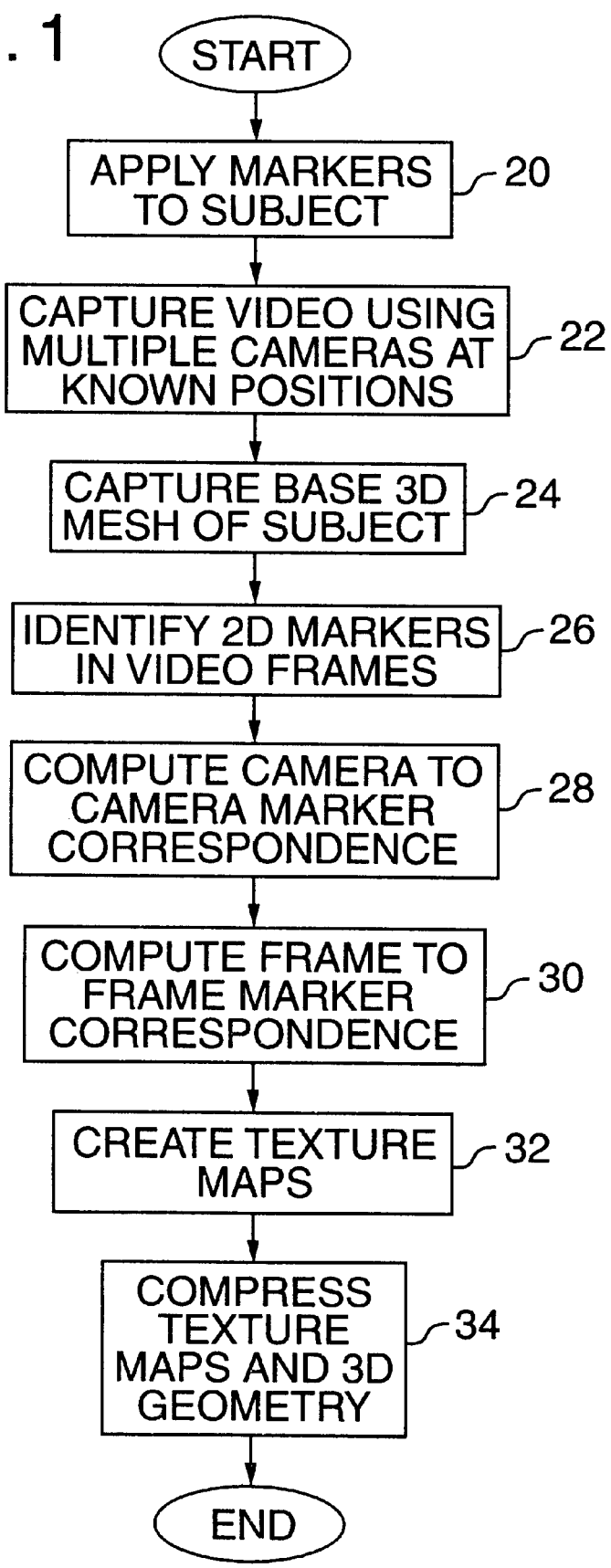
FIG. 1 is a flow diagram illustrating an overview of a method for capturing the facial expressions of an actor's face.

FIG. 1 is a flow diagram illustrating an overview of a method for capturing the facial expressions of an actor's face. As with all of the diagrams referenced below, the following explanation of FIG. 1 is annotated with reference numbers labeling the corresponding features in the diagram. As shown in FIG. 1, the first step is to apply markers to the actor's face (20). Then, multiple cameras at positions around the actor's face simultaneously record video sequences of the actor's face as the actor talks and emotes (22). In addition to capturing video, the method also captures a base mesh of the actor's face with the markers applied (24).

The method uses the markers on the base mesh and in the video sequences to track the deformation of the base mesh over time. Specifically, the method identifies the markers in the camera views for each frame (26) and then computes the correspondence among the markers of the camera views to determine their 3D positions (28). Next, the method computes the correspondence of the markers from frame to frame (30). This step (30) also entails mapping the markers in the base mesh with the markers in the video data. By determining the correspondence of the markers from frame to frame, the method can track how locations on the face move over time. The 3D positions of the markers can then be used to distort the 3D model in mimicry of the distortions of the real face.

The video sequences from the camera are also used to create texture maps for each frame that represent the color and shading of the facial expressions (32). To create the textures, the method removes the markers from the camera images using image processing techniques. It then merges camera images from the multiple cameras into a single texture map per frame. When the resulting marker-free texture map is applied to the 3D reconstructed face mesh, the result is a remarkably life-like 3D animation of facial expression. Both the time varying texture created from the video streams and the accurate reproduction of the 3D face structure contribute to the believability of the resulting animation.

To reduce transmission bandwidth and memory requirements, the 3D geometry and the texture maps are compressed (34). The temporal coherence of the texture maps can be exploited using video compression, such as MPEG 4 video compression. The temporal coherence of the 3D deformations can also be exploited by converting a matrix of the 3D deformation data into its principal components and coefficients.

Each of the steps of the method illustrated in FIG. 1 are explained in more detail below. We describe this method by using our initial implementation as an example. To illustrate the operation of this implementation, we describe how we used it to create a model of an actor's face for a test case. The first section begins with an explanation of the data capture stage. The next section then describes how to determine the correspondence among the markers in each camera view and over time. Subsequent sections describe processes for capturing and moving the mesh and for making the texture maps. The final sections describe the facial model data structures, and compression, and results obtained in the test case.

Data Capture

Figure 2:
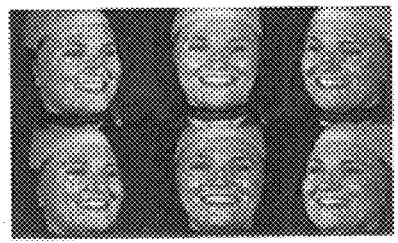
FIG. 2 shows six different camera views of an actor's face to illustrate the pattern of the video cameras used to capture video sequences in a test case application of the method of FIG. 1.

The method illustrated in FIG. 1 uses multiple cameras to capture video sequences of an animated subject from different positions around the subject. For our test case, we used six studio quality video cameras arranged in the pattern shown in FIG. 2 to capture the video data. FIG. 2 shows the six camera views of the actor's face.

In the test case, each of the six cameras was individually calibrated to determine its intrinsic and extrinsic parameters and to correct for lens distortion. For additional information on the calibration process, see Faugeras, O., *Three-dimensional computer vision*, MIT Press, Cambridge, Mass., 1993.

The markers used in the test case were $\frac{1}{8}$" circular pieces of fluorescent colored paper (referred to as dots) in six different colors. We glued 182 dots onto the actor's face and arranged them so that dots of the same color were as far apart as possible from each other. This made the task of determining correspondence of the dots from frame to frame much easier.

The actor was illuminated with a combination of visible and near UV light. Because the dots were painted with fluorescent pigments, the UV illumination increased the brightness of the dots significantly and moved them further away in color space from the colors of the face than they would ordinarily be. This made them easier to track reliably.

Before the video shoot, the actor's face was digitized using a Cyberware scanner, a conventional system used in 3D graphics for generating a 3D model of a 3D object. This scan was used to create the base 3D face mesh which was then distorted using the positions of the tracked dots. In this particular case, the 3D model was a polygonal mesh comprising an array of vertices, each specified in terms of coordinates in a 3D coordinate space. Since the details of capturing the base mesh are not critical to the invention and can be performed using known techniques, the details of the process for capturing the initial base mesh need not be described further.

While we used fluorescent paper dots in the test case, a variety of different types and colors of markers can be used. One alternative type of marker is a retro-reflective glass bead. Preferably, the markers should be selected so as to be easily distinguishable from the colors on the object being modeled.

Labeling the Markers

The method uses the markers to generate a set of 3D points that act as control points to warp the base mesh of the 3D object being modeled. It also uses them to establish a stable mapping for the textures generated from each of the camera views. This requires that each marker have a unique and consistent label over time so that it is associated with a consistent set of mesh vertices.

The process of labeling markers begins by first locating (for each camera view) connected components of pixels that correspond to the markers. The 2D location for each marker is computed by finding the two dimensional centroid of these connected components. The labeling process then proceeds by computing a correspondence between 2D dots in different camera views. Using the 2D locations in each camera view, the labeling process can then reconstruct potential 3D locations of dots by triangulation. To track motion of the markers over time, the labeling process starts with a reference set of dots based on the dot locations in the initial base mesh and pairs up this reference set with the 3D locations in each frame. This gives a unique labeling for the dots that is maintained throughout the video sequence.

Identifying the 2D Location of Markers in the Camera Views

For each camera view, the 2D coordinates of each marker are computed. Since the marker is typically depicted as a group of connected pixels in the image, the implementation uses the centroid of the marker as its 2D location in the camera image. FIG. 3 illustrates an overview of a method for computing the centroid of the markers in the images of the video sequences. As shown, this method includes the following steps: 1) color classification (40), 2) connected color component generation (42), and 3) centroid computation (44). Our initial implementation of each of these steps is detailed below.

First, each pixel is classified as belonging to one of the six dot colors or to the background. Then, a depth first search is used to locate connected blobs of similarly colored pixels. Each connected colored blob is grown by one pixel to create a mask used to mark those pixels to be included in the centroid computation.

A color class image for each marker color is created manually by taking a frame of the video sequence and marking those pixels that belong to the color. All of the unmarked pixels are set to the RGB color (0,0,0). Preferably, a color that never occurs in any of the camera images, such as pure black, should be used as the out-of-class color label. All of the marked pixels in the color class image retain their RGB colors. These color class images are easily generated using the "magic wand" available in many image editing programs.

Figure 4:
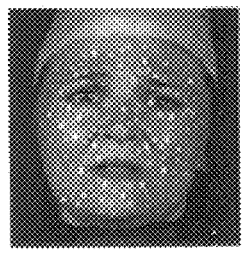
FIG. 4 is a camera image of the actor's face taken from one of the video cameras in the test case.
Figure 5:
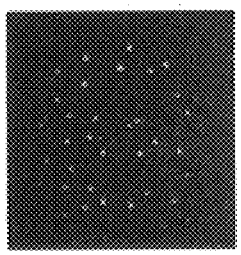
FIG. 5 shows a color class image for the yellow dots, selected from the image in FIG. 4, as an example of a color class image used to locate reference markers in a camera image.

A color class image is automatically created for the background color (e.g., skin and hair) by labeling as out-of-class any pixel in the image that was previously marked as a marker in any of the marker color class images. This produces an image of the face with black holes where the markers were located previously. An example of a typical color class image for the yellow dots is shown in FIGS. 4 and 5 FIG. 4 shows an image of the actor's face, and FIG. 5 shows a color class image for the yellow dots, selected from the image in FIG. 4.

The color class images are used to generate the color classes $C_i$. Assume that the color class image for color class $C_i$ has n distinct colors, $c_1 \ldots c_n$. Each of these distinct colors is added to the color class $C_i$. Once the color classes for all of the colors are constructed, they are used to classify new color data using a nearest neighbor classifier as described in Schürmann, J.,. *Pattern Classification: A Unified View of Statistical and Neural Approaches*. John Wiley and Sons, Inc., New York, 1996.

In a nearest neighbor classifier, the class label for a color p is computed by searching through all of the colors in each color class $C_i$ and finding the color closest to p in RGB space. The color p is given the label of the color class containing the nearest color. If the training set data and the colors to be classified are quantized and bounded, as they are for our data set, then a very efficient and simple classifier is easily constructed since the colors have only three dimensions R, G, and B. Our implementation employed uniform quantization and placed a bound of 0 . . . 255 on the colors.

Each RGB color vector $c_i$ maps to a quantized vector $ĉ_i$. The elements $ĉ_i[1]$, $ĉ_i[2]$, and $ĉ_i[3]$ are used as indices into a three dimensional array M. The three indices of M correspond to the R, G, and B axes in RGB color space and every element in M corresponds to a point on a cubical lattice in the RGB color cube. The training set data is used to enter color class labels into the elements of M $$M[ĉ_i[1], ĉ_i[2], ĉ_i[3]] = \text{colorClass}(ĉ_i)$$

where the function colorClass returns the color class of color $ĉ_i$ except when a color is present in more than one color class. In this case, colorClass returns the color class of the background color.

Every remaining element in M that has not received a color class label is given the label of the nearest element that does have a label. The nearest element is determined by finding the Euclidean distance between the two points in RGB space that correspond to the two array elements in M. Once M is constructed, classification of a new color is very fast and simple. First, the color classifier method quantizes the R,G,B values of p. The quantized values are used as indices into the array M, which now has a color label in every element. The indexed element contains the color label for the color p. In the initial implementation, the array M is 32 by 32 by 32 element cube, where the three axes of the cube correspond to Red, Green, and Blue color values, respectively. Other forms of color space structures and color formats may be used as well.

This classifier method is quite robust. The color class training data can be created from a single frame in the video sequence. For example, in our test case, the color training data for the data set was created from a single frame of a 3330 frame sequence. The color classifier reliably labeled the dot colors throughout the entire video sequence. False positives are quite rare, with one major exception, and are almost always isolated pixels or two pixel clusters. The majority of exceptions arise because the highlights on the teeth and mouth match the color of the white marker training set. Fortunately, the incorrect white marker labelings occur at consistent 3D locations and are easily eliminated in the 3D dot processing stage. Preferably, the marker colors should be chosen to avoid conflicts with colors on the subject being modeled.

Figures 6, 7:
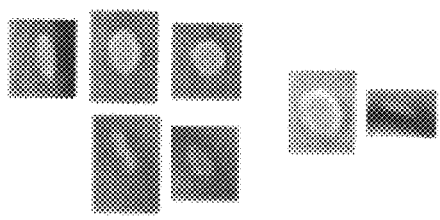
FIG. 6 shows an example of a green and a purple reference dot taken from three different cameras to illustrate the differences in the reference dots in different camera views (the purple dot is occluded in one camera).
FIG. 7 is an example of a single green reference marker seen from a single camera but in two different frames.

The color classifier generalizes well so that even fairly dramatic changes in marker color over time do not result in incorrect classification. This is significant because the variation between the same dot as seen from different cameras or between the same dot as seen through the same camera in different frames can be substantial. To illustrate this problem, FIG. 6 shows two dots, a green dot and a purple dot, seen from three different cameras. FIG. 6 shows only two versions of the purple dot because the dot is occluded in the third camera's view. FIG. 7 shows a single green dot seen from a single camera, but in two different frames. The color classifier is sufficiently robust to correctly classify the dot in FIG. 7 as green in both frames.

The specific method for finding connected color components can vary depending on whether the video is interlaced. The initial implementation is designed to find connected color components in pairs of interlaced fields, spaced apart in time. In interlaced video, there is significant field to field movement, especially around the lips and jaw. The movement is sometimes great enough so that there is no spatial overlap at all between the pixels of a marker in one field and the pixels of the same marker in the next field. If the two fields are treated as a single frame, then a single marker can be fragmented, sometimes into many pieces.

One approach is to find connected color components in each field and use these to compute the 2D dot locations. Unfortunately, this does not work well because the markers often deform and are sometimes partially occluded. Therefore, the threshold for the number of pixels needed to classify a group of pixels as a marker has to be set very low. In our implementation for interlaced video, any connected component that has more than three pixels is classified as a marker rather than noise. If just the connected pixels in a single field are counted, then the threshold would have to be reduced to one pixel. This would cause false marker classifications because false color classifications can occur in clusters as large as two pixels.

Instead, our implementation for interlaced video finds connected components and generates lists of potential 2D dots in each field. Each potential 2D dot in field one is then paired with the closest 2D potential dot in field two. Because markers of the same color are spaced far apart, and because the field to field movement is not very large, the closest potential 2D dot is virtually guaranteed to be the correct match. If the sum of the pixels in the two potential 2D dots is greater than three pixels, then the connected components of the two 2D potential dots are merged, and the resulting connected component is marked as a 2D dot.

The process of finding connected color components can be simplified by using cameras that generate non-interlaced video. In this case, there is only a single image per frame for each of the camera views. Thus, the problems associated with searching two fields, spaced apart in time, are eliminated. Specifically, the search for connected pixels is simplified since there is no need to look for pairs of potential dots from different fields. A search for connected pixels can be conducted using a higher threshold, e.g., greater than three connected pixels qualifies as a dot.

After identifying connected components, the next step in identifying marker locations is to find the centroid of the connected components marked as 2D dots in the previous step. Our initial implementation computes two-dimensional gradient magnitude image by passing a one-dimensional first derivative of Gaussian along the x and y directions and then taking the magnitude of these two values at each pixel. The centroid of the colored blob is computed by taking a weighted sum of positions of the pixel (x,y) coordinates which lie inside the gradient mask, where the weights are equal to the gradient magnitude.

Finding the Correspondence Among 2D Markers and 3D Reconstruction

Once the 2D locations of the markers are identified in the images from each of the camera views, a pixel matching method can be used to find the correspondence among markers for each frame. Knowing the correspondence among the markers and the locations of the cameras relative to the actor, a 3D reconstruction method can then compute possible 3D locations for the markers.

In order to capture good images of both the front and the sides of the face, the cameras were spaced far apart in the initial implementation. The positions of the six cameras were such that there were extreme changes in perspective between the different camera views. As such, the projected images of the colored markers were very different as illustrated in FIG. 6, which shows some examples of the changes in marker shape and color between camera views.

Establishing correspondence among markers in the camera views can be accomplished by any of a variety of matching techniques. However, matching techniques such as optical flow or template matching may tend to generate incorrect matches. In addition, most of the camera views will only see a fraction of the markers, so the correspondence has to be sufficiently robust to cope with occlusion of markers in some of the camera views. To determine an accurate model of 3D motion, a significant number of markers are needed on the surface of a complex object such as the human face. However, with more markers, false matches are also more likely and should be detected and removed.

Our initial implementation uses ray tracing in combination with an algorithm described in Fischler, M. A., and Booles, R. C., "Random sample consensus: A paradigm for model fitting with applications to image analysis and automated carography," *Communications of the ACM* 24, 6(August 1981), 381–395, to establish marker correspondence and to compute accurate 3D dot positions. This algorithm is sufficiently robust to deal with occluded markers and false matches.

Figure 8:
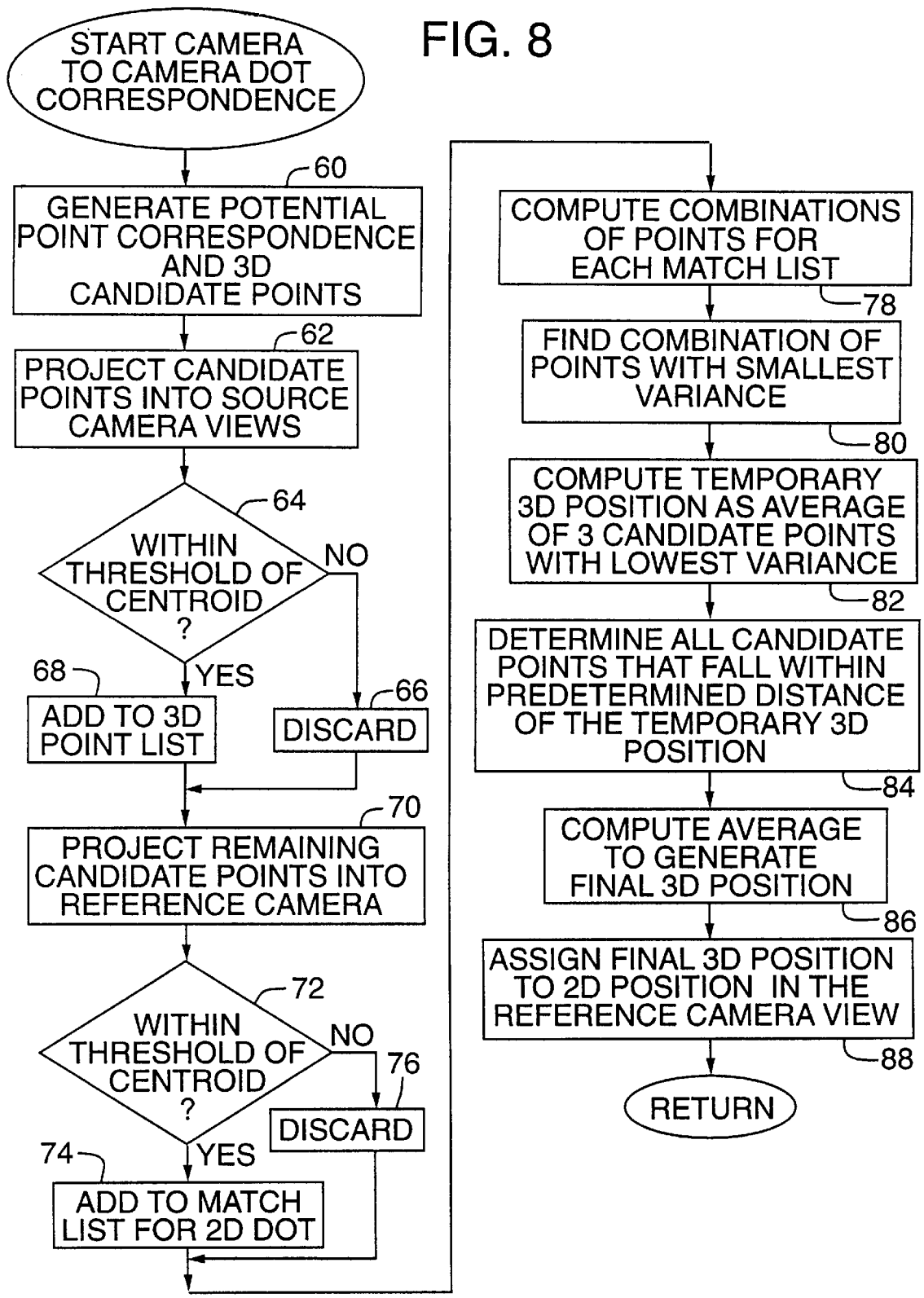
FIG. 8 is a flow diagram illustrating a method for computing 3D positions of reference markers from camera images of an actor's face with reference markers applied.

FIG. 8 is a flow diagram illustrating a specific implementation of a method for computing the 3D positions of the markers. First, all potential point correspondences between cameras are generated using the 3D reconstruction method referred to above (60). If there are k cameras, and n 2D dots in each camera view, then the following number of correspondences will be tested:

$$\binom{k}{2} n^2$$

Each correspondence gives rise to a 3D candidate point defined as the closest point of intersection of rays cast from the 2D dots in the two camera views.

Next, the 3D candidate point is projected into each of the two camera views used to generate it (62). If the projection is further than a user-defined threshold distance (in our case two pixels) from the centroid of either 2D point (64), then the point is discarded as a potential 3D point candidate (66). All the 3D candidate points which remain are added to the 3D point list (68).

Each of the points in the 3D point list is projected into a reference camera view (70). The reference camera view is the view of the camera with the best view of all the markers on the face. If the projected point lies within a predetermined distance (e.g., two pixels) of the centroid of a 2D dot visible in the reference camera view (72), then it is added to the list of potential 3D candidate positions for that 2D dot (74). This list is the list of potential 3D matches for a given 2D dot. Other candidate positions not within the predetermined distance of the 2D location of the marker in the reference camera view are discarded (76).

For each 3D point in the potential 3D match list, each possible combination of three points in the 3D point list are computed (78), and the combination with the smallest variance is chosen (80). The average location of the 3 points with lowest variance is set as a temporary location of the 3D point (82). Then, all 3D points that lie within a user defined distance are identified (84) and averaged to generate the final 3D dot position (86). In our case, the user-defined distance was determined as the sphere subtended by a cone two pixels in radius at the distance of the temporary 3D point. This 3D dot position is assigned to the corresponding 2D dot in the reference camera view (88).

A number of optimizations to the approach shown in FIG. 8 are possible. To be more efficient, the method could be adapted to search for potential camera to camera correspondences only along epipolar lines and use any of a variety of known space subdivision techniques to find 3D candidate points to test for a given 2D point. However, because the number of markers in each color set was small in our test case (never more than 40), both the 2D dot correspondence step and the 3D position reconstruction were reasonably fast. The initial implementation, took less than a second to generate the 2D dot correspondences and 3D dot positions for six camera views. These results were produced on a computer with a 200 MHz Pentium Pro microprocessor from Intel Corp.

For our test case, the 2D dot correspondence calculation was dominated by the time taken to read in the images of the six camera views and to locate the 2D dots in each view.

Consequently, while a variety of stereo matching methods could be used, the extra complexity of more efficient stereo matching algorithms appears not to be justified for this particular application.

Correspondence of the Markers from Frame to Frame

At this point in the 3D capture phase of our method, there is a set of unlabeled 3D dot locations for each frame. The next stage assigns, across the entire sequence, consistent labels to the 3D dot locations. This is accomplished by defining a reference set of dots D and matching this set to the 3D dot locations given for each frame. The motion of the reference dots over time can be described as follows: Let $d_j \in D$ be the neutral location for the reference dot j. We define $d_j$'s position at frame i by an offset vector $v^i_j$, i.e., $$d^i_j = d_j + v^i_j$$

Preferably, the correspondence computation should be quite efficient in view of fact that even a short video sequence can involve thousands of frames and over a hundred reference markers per frame. To simplify the matching, our test case used a marker pattern that separated markers of a given color as much as possible so that only a small subset of the unlabeled 3D dots needed to be checked for a best match. Unfortunately, simple nearest neighbor matching does not work well for several reasons: some markers occasionally disappear from some camera views, some 3D dots may move more than the average distance between 3D dots of the same color, and occasionally extraneous 3D dots appear, caused by highlights in the eyes or teeth. Fortunately, neighboring markers move similarly, and this fact can be exploited by modifying the nearest neighbor matching algorithm so that it is still efficient and robust.

Figure 9:
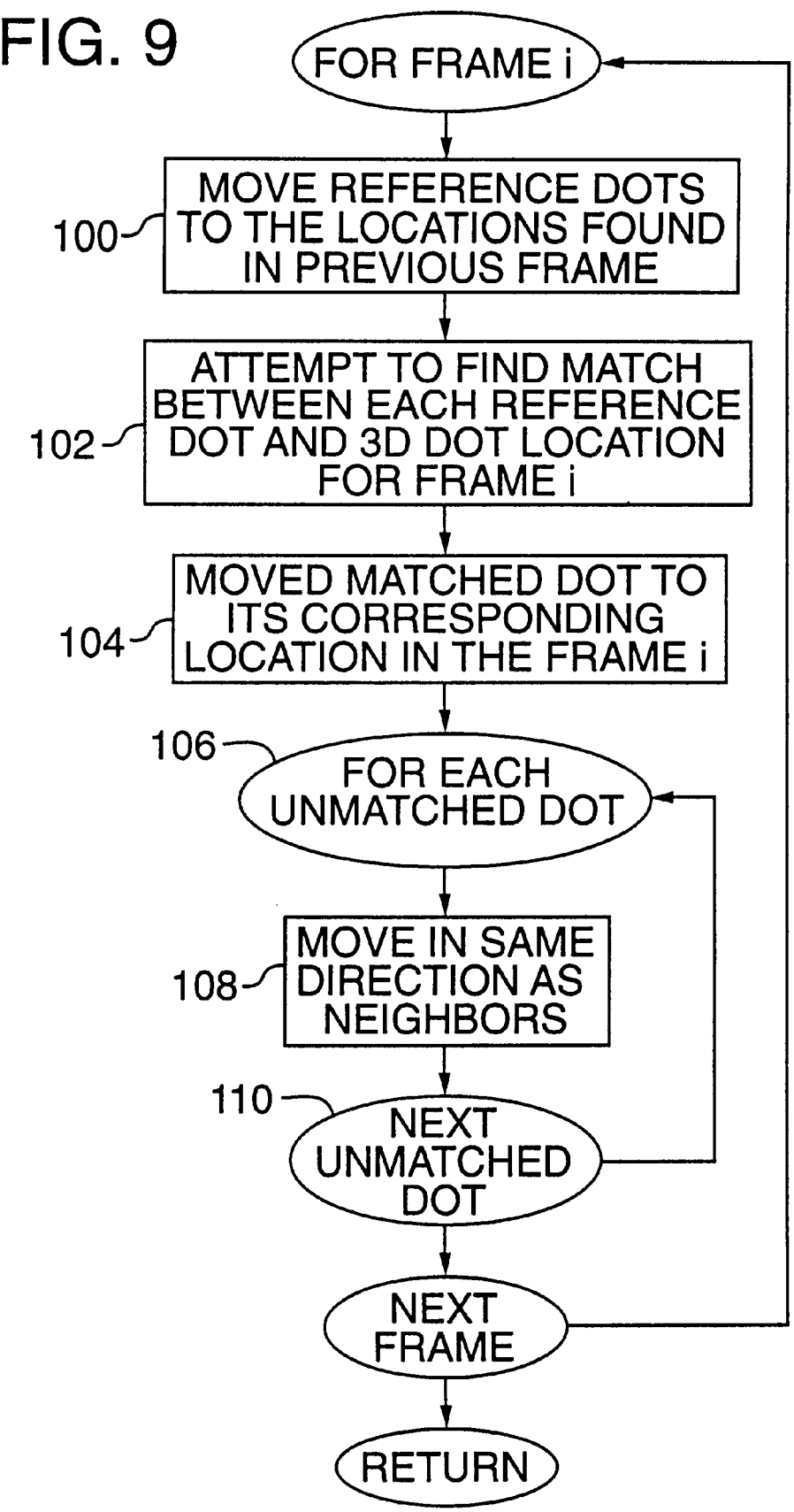
FIG. 9 is a flow diagram illustrating a method for computing the correspondence of reference markers from frame to frame to track motion of the reference markers.

FIG. 9 is a flow diagram illustrating an overview of the frame to frame correspondence method used in the initial implementation. For each frame i, the method begins by moving the reference dots to the locations found in the previous frame (100). Next, it finds a (possibly incomplete) match between the reference dots and the 3D dot locations for frame i (102). It then moves each matched reference dot to the location of its corresponding 3D dot (104). If a reference dot does not have a match, it "guesses" a new location for it by moving it in the same direction as its neighbors (106, 108). The steps for moving unmatched dots are repeated until all of the unmatched dots have been moved (see steps 106, 108, 110).

Acquiring the reference Set of Dots

As described above, the 3D mesh is obtained with the markers ("dots") applied to the surface of the object being modeled. Since the dots are visible in both the geometric and color information of the scan, the user can hand place the reference dots. In our test case, the coordinate system for the scan of the base mesh differed from the one used for the 3D dots, but only by a rigid body motion plus a uniform scale. The difference between the coordinate system was addressed by computing a transform to map points in one coordinate system to another, using this for all frames. To compute the transform for our test case, we first took a frame in which the subject had a neutral face. We hand-aligned the 3D dots from the frame with the reference dots acquired from the scan. The hand-aligned positions served as an initial starting position for the matching routine described below. The matching routine was used to find the correspondence between the 3D dot locations, $f_i$, and the reference dots, $d_i$. We used the method described in Horn, B. K. P., "Closed-form solution of absolute orientation using unit quaternions," *Journal of the Optical Society of America* 4, 4(April 1987) to find the transform, T, between the two sets of dots. The temporary locations of the reference dots were replaced with new locations as set forth in the following equation.

$$d_i = T f_i$$

The Matching Routine

To match 3D dots over a sequence of frames, our initial implementation performs a conservative match, and then a second, less conservative match for each frame. After the conservative match, it moves the reference dots (as described in the next section) to the locations found in the conservative match and performs a second, less conservative match. By moving the reference dots between matches, the frame to frame correspondence method reduces the problem of large 3D dot position displacements.

Figure 10A:
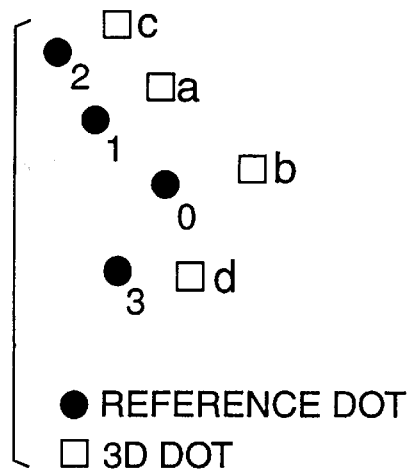
FIGS. 10A–10C illustrate examples of four reference dots and neighboring 3D dots to illustrate aspects of the frame to frame correspondence method of FIG. 9.
Figure 10B:
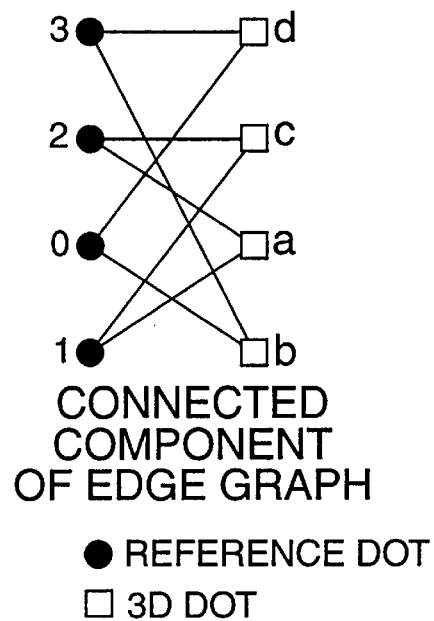
Figure 10C:
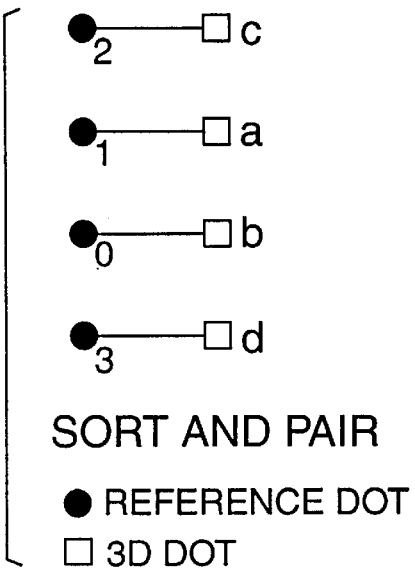

The matching routine used in the initial implementation can be thought of as a graph problem where an edge between a reference dot and a frame dot indicates that the dots are potentially paired. To demonstrate the operation of the matching routine, FIGS. 10A–C illustrate an example of four reference dots (labeled 0, 1, 2, and 3) and neighboring 3D dots (labeled a, b, c, and d), and FIG. 11 illustrates the steps in the routine. FIG. 10A illustrates an example of the spacing of the reference and 3D dots relative to each other in a simplified 2D perspective. The next diagram, FIG. 10B, shows an example of a graph computed by the matching routine. The potential pairings of the reference and 3D dots are depicted as edges in the graph. Finally, FIG. 10C shows how the matched dots in the graph are sorted and then paired.

The matching routine proceeds as follows. First, for each reference dot (120), it searches for every 3D dot within a given distance, epsilon (122) in the next frame. To construct the graph, it adds an edge for every 3D dot of the same color that is within the distance, epsilon (124)(see FIG. 10B for example). It then searches for connected components in the graph that have an equal number of 3D and reference dots (most connected components will have exactly two dots, one of each type)(126). This enables the matching routine to identify ambiguous matches in the graph that require further processing. Next, it sorts the dots in the vertical dimension of the plane of the face (128) and uses the resulting ordering to pair up the reference dots with the 3D dot locations (130). Note in FIG. 10C that the reference dots and 3D dots are sorted in the vertical dimension, which enables the ambiguous potential pairings to be resolved into a single pairing between each reference dot and 3D dot.

Figure 12A:
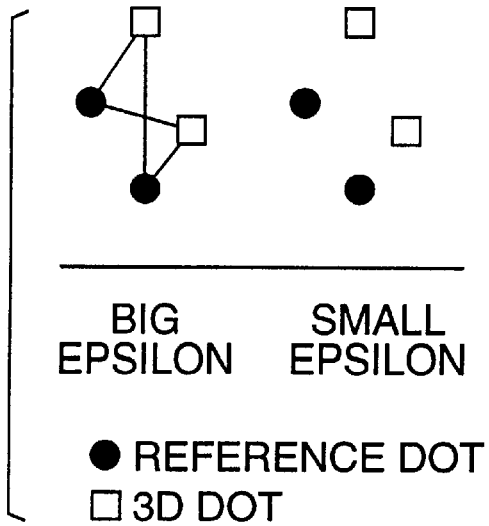
FIGS. 12A–12C show examples of reference dots and neighboring 3D dots from another frame to illustrate the operation of the matching routine.
Figure 12B:
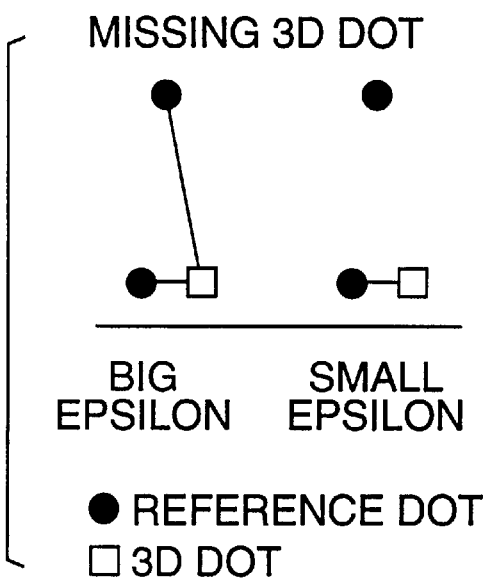
Figure 12C:
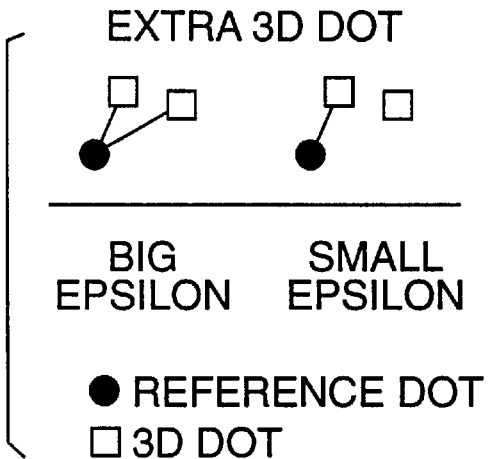

In the video sequences we captured, the difference in the 3D dot positions from frame to frame varied from zero to about 1.5 times the average distance separating closest dots. To adjust for this, we ran the matching routine with several values of epsilon and picked the run that generated the most matches. Different choices of epsilon produce different results as shown in FIG. 12. FIG. 12A shows an example of the result of the matching routine for a large and small epsilon. If epsilon is too small, the matching routine may not find matches for 3D dots that have moved significantly from one frame to the next as shown on the right side of FIG. 12A. (If a dot has no edge, it has not been matched with another dot.) Conversely, if epsilon is too large, then the connected components in the graph will expand to include too many 3D dots as shown on the left side of FIG. 12A. FIG. 12B shows the case where there is a missing 3D dot, with big and small epsilon values. Using a bigger epsilon, the matching routine assigns more than one reference dot to a 3D dot and using a smaller epsilon, it leaves a reference dot unmatched. FIG. 12C shows the case where there is an extra 3D dot, with big and small epsilon values. Here, the matching routine finds more than one matching 3D dot for a reference dot using a bigger epsilon, and leaves a 3D dot unmatched using a smaller epsilon.

For our test case, we tried approximately five distances for epsilon ranging from 0.8 to 1.8 of the average distance between closest reference dots.

In the second, less conservative match for a frame, our implementation performs an additional step to locate matches where a dot may be missing (or extra). Specifically, it invokes the matching routine on the dots that have not been matched, each time with smaller and smaller epsilon values. This resolves situations such as the one shown in FIG. 12C.

Moving the Dots

Figure 13:
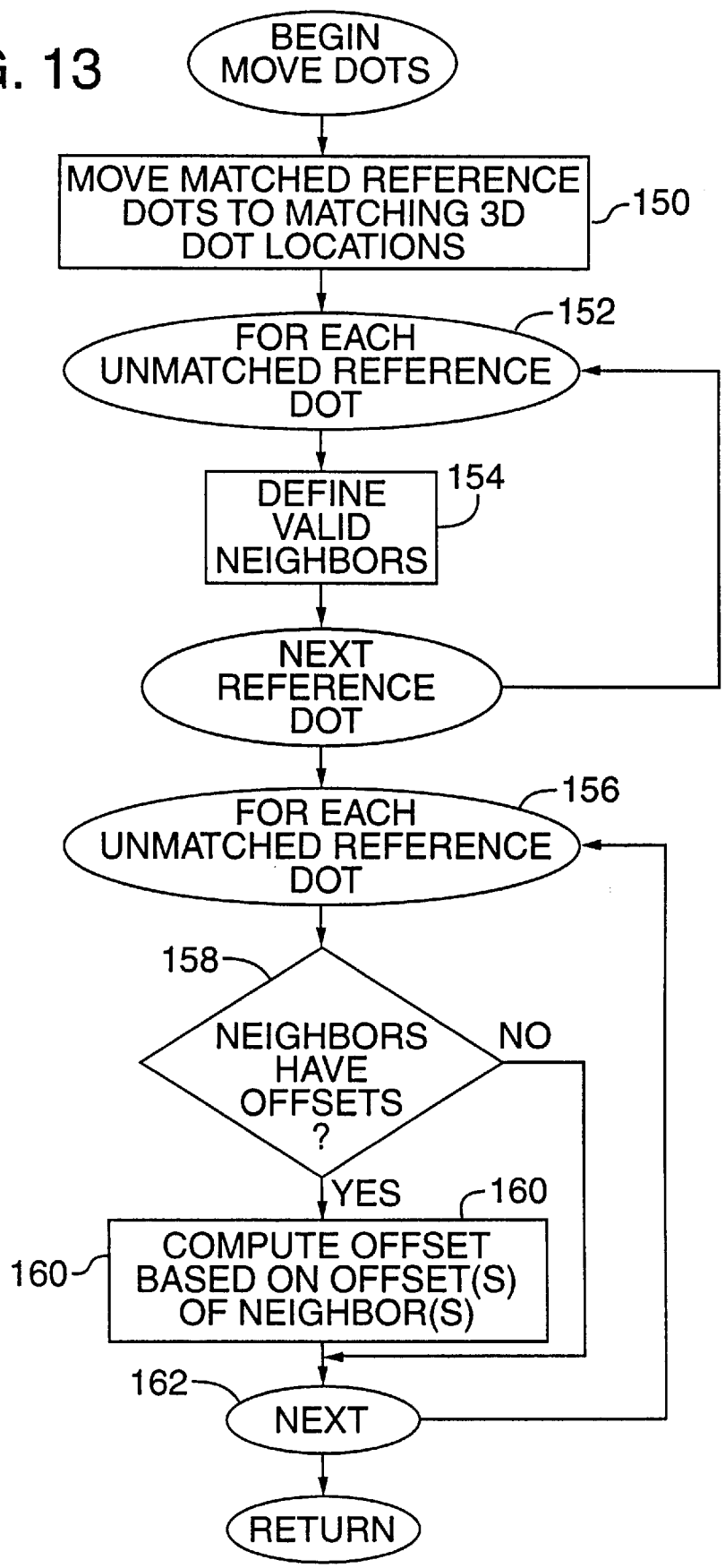
FIG. 13 is a flow diagram illustrating a method used in the initial implementation for moving the position of 3D reference dots.

The frame to frame correspondence method moves the reference dots to the locations of their matching 3D dots and interpolates the locations for the remaining, unmatched reference dots by using their nearest, matched neighbors. FIG. 13 is a flow diagram illustrating a method used for moving the dots in the initial implementation. The method begins by moving the matched reference dots to the matching 3D dot locations (150).

For each unmatched reference dot (152), the implementation defines a valid set of neighbors using the routine described below entitled "Moving the Mesh," ignoring the blending values returned by the routine (154).

Once the neighbors are defined, the implementation proceeds to compute the deformation vector (an offset) for each unmatched reference dot (156). To compute this vector for an unmatched dot $d_k$, it uses a combination of the offsets of all of its valid neighbors. Let $n_k \subset D$ be the set of neighbor dots for dot $d_k$. Let $\hat{n}_k$ be the set of neighbors that have a match for the current frame i. Provided $\hat{n}_k \neq \emptyset$, the offset vector for dot $d_k^i$ is calculated as follows: let $v^i_j = d^i_j - d_j$ be the offset of dot j (recall that $d_j$ is the initial position for the reference dot j). The equation used to compare the offset vector is expressed as:

$$v_k^i = \frac{1}{\|\hat{n}_k\|} \sum_{d^i_j \in \hat{n}_k} v^i_j.$$

The implementation checks to make sure that the neighbors have an offset associated with them (158). The offset of a matched dot is a vector that defines the x and y displacement of the dot with a corresponding dot in the frame of interest. If the current dot has at least one matched neighbor, the implementation computes its deformation vector based on the offsets of the neighbor(s) as set forth above (160). If there are no matched neighbors, the routine repeats as necessary, treating the moved, unmatched reference dots as matched dots. The iterative nature of the routine is illustrated in FIG. 13 by the loop back to step 156 to begin processing of the next unmatched reference dot (162). Eventually, the movements will propagate through all of the reference dots.

Mesh Construction and Deformation

To construct a mesh for our test case, we began with a Cyberware scan of the actor's head. In order to align the 3D mesh with the 3D video dot data, the actor's face was scanned with the markers attached to it. The resulting scan suffered from four problems:

The markers caused "bumps" on the mesh.
Several parts of the mesh were not adequately scanned, namely, the ears, one side of the nose, the eyes, and under the chin. These were manually corrected.
The mesh did not have an opening for the mouth.
The scan had too many polygons.

We removed the bumps caused by the markers by selecting the vertices that were out of place (approximately 10–30 per dot) and found new locations for them by blending between four correct neighbors. Since the scan produced a rectangular grid of vertices, we picked the neighbors to blend between in (u,v) space, i.e, the nearest valid neighbors in the positive and negative u and v direction. The polygons at the mouth were split and then filled with six rows of polygons located slightly behind the lips. We mapped the teeth and tongue onto these polygons when the mouth was open.

We reduced the number of polygons in the mesh from approximately 460,000 to 4800 using Hoppe's mesh simplification method. See Hoppe, H., "Progressive meshes," in *SIGGRAPH 96 Conference Proceedings* (August 1996), H. Rushmeier, ed., Annual Conference Series, ACM SIGGRAPH, Addison Wesley, pp. 99–108, held in New Orleans, La., Aug. 4–9 1996.

Moving the Mesh

To simulate movement of an object, our initial implementation moves each vertex in the 3D model of the object by a deformation vector computed based on the offsets of neighboring 3D markers. Specifically, a routine computes each deformation vector as a linear combination of the offsets of the nearest dots. In this routine, the linear combination for each vertex $v_j$ is expressed as a set of blend coefficients, $d_j^k$, one for each dot, such that $$\sum_{d_k \in D} \alpha_k^j = 1$$

(most of the $d^i_k$ will be zero). The new location $p^i_j$ of the vertex $v_j$ at frame i is then $p^i_j = p_j + \Sigma d_j^k \|d_i^k - d_k\|$ where $p_j$ is the initial location of the vertex $v_j$.

For most of the vertices, the $\alpha_j^k$s are a weighted average of the closest dots. However, exceptions should be made for sub-parts of the model that are known to move together. In animating a human face, the vertices in the eyes, mouth, behind the mouth, and outside of the facial area should be treated slightly differently since, for example, the movement of dots on the lower lip should not influence vertices on the upper part of the lip. Also, it may be necessary to compensate for residual rigid body motion for those vertices that are not directly influenced by a neighboring marker (e.g., vertices on the back of the head).

Figure 16:
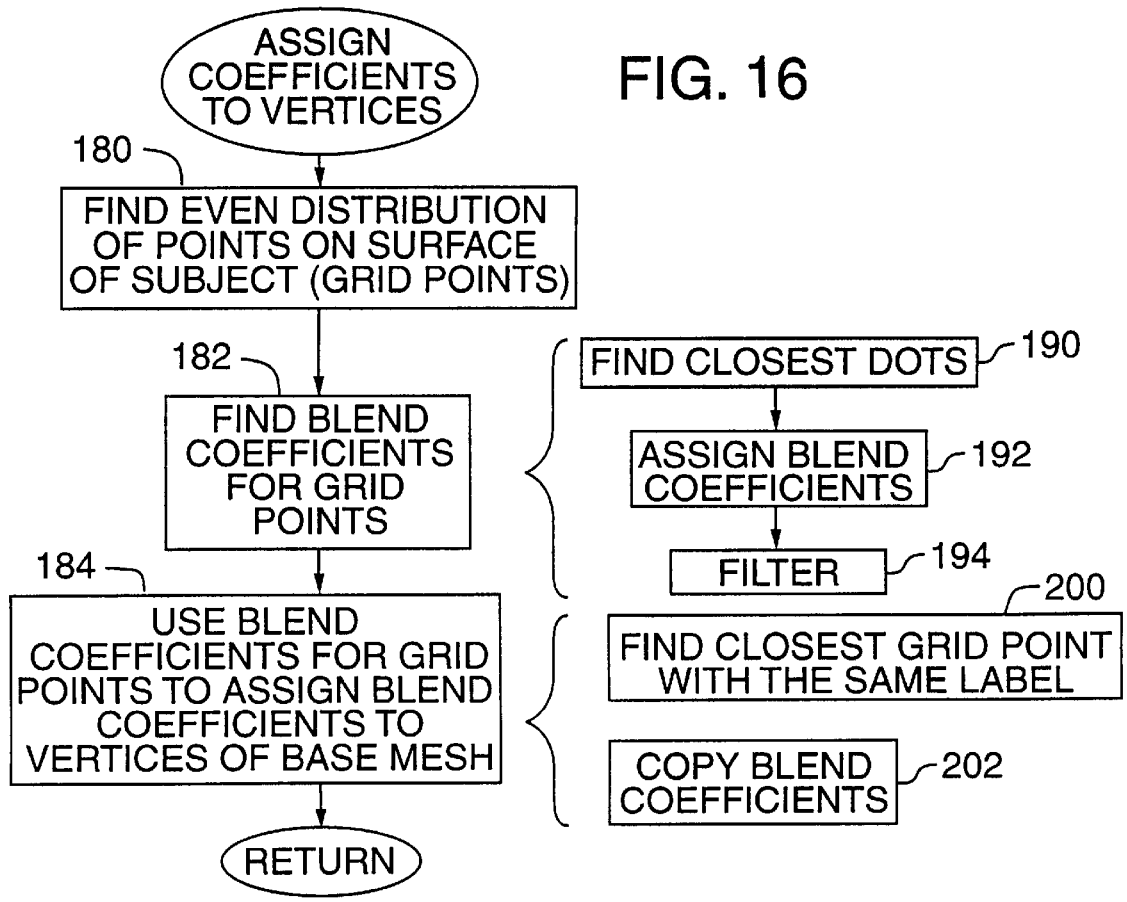
FIG. 16 illustrates a method for assigning motion to vertices in the base mesh based on the motion of the neighboring reference markers.

FIG. 16 is a flow diagram illustrating a method for assigning the blend coefficients to the vertices used in the initial implementation. Initially, this method finds an even distribution of points on the surface of the face called the grid points (180). The method then finds blend coefficients for the grid points evenly distributed across the face (182), and uses the grid points to assign blend coefficients to the vertices (184). In some cases, it may be possible to assign blend coefficients to elements in a 3D model without the intermediate step of using grid points. However, the grid points are helpful for our test case because both the markers and the mesh vertices were unevenly distributed across the face, making it difficult to get smoothly changing blend coefficients. The next section describes aspects of this method for moving the mesh in more detail.

Figure 14:
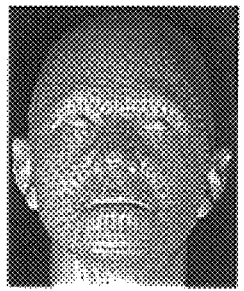
FIG. 14 is an image of red grid points on a simulated version of the actor's face, with outline dots shown in green and blue.

In our test case, the grid consisted of roughly 1400 points, evenly distributed and placed to follow the contours of the face. FIG. 14 illustrates the grid points in red. In this particular example, the points along the nasolabial furrows (green), nostrils (green), eyes (green), and lips (blue) were treated slightly differently than the other points to avoid blending across features such as the lips.

Figure 15:
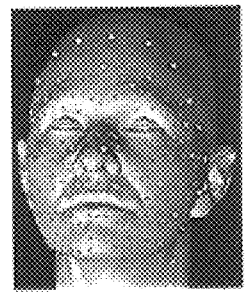
FIG. 15 is an image illustrating the position of reference markers of a simulated version of the actor's face.

Because we wanted the mesh movement to go to zero outside of the face, we added another set of unmoving dots to the reference set in our test case. These new dots formed a ring around the face enclosing all of the reference dots. FIG. 15 shows an example of the original dots and the extra ring of dots in white. For each frame, these extra reference dots can be used to determine the rigid body motion of the head (if any) using a subset of those reference dots which are relatively stable. This rigid body transformation can then be applied to the new dots.

In the example shown in FIG. 14, we labeled the dots, grid points, and vertices as being above, below, or neither with respect to each of the eyes and the mouth. To differentiate features and facial regions that tend to have independent motion, we made the restriction that dots above a given feature could not be combined with dots that were below that same feature (or vice-versa). We labeled the dots using three curves, one for each of the eyes and one for the mouth. Dots directly above (or below) a curve were labeled as above or below that curve. Otherwise, they were labeled neither.

Assigning Blends to the Grid Points

The diagram in FIG. 16 illustrates the steps of a routine used to assign blend values to the grid points in the initial implementation. This routine finds the closest reference markers to each grid point (190), assigns blend values to these reference markers (192), and then filters the blend coefficients using a low pass filter to more evenly distribute the blend coefficients among the grid points (194).

Finding the ideal set of reference dots to influence a grid point can be complicated in cases where the reference dots are not evenly distributed across the face as in the example shown in FIG. 15. The routine in our implementation attempts to find two or more dots distributed in a rough circle around a given grid point. To do this, it compensates for the dot density by setting the search distance using the two closest dots and by checking for dots that will "pull" in the same direction.

To find the closest dots to the grid point p, the routine first finds $\delta_1$ and $\delta_2$, the distance to the closest and second closest dot, respectively. The routine then uses these distances to find an initial set of dots $D_n$ for further analysis. Let $D_n \subset D$ be the set of dots within $$1.8 \frac{\delta_1 + \delta_2}{2}$$

distance of p whose labels do not conflict with the label of grid point p. Next, the routine checks for pairs of dots that are more or less in the same direction from p and removes the furthest one. More precisely, the routine employs the following approach.

Let $\hat{v}_i$ be the normalized vector from p to the dot $d_i \in D_n$ and let $\hat{v}_j$ be the normalized vector from p to the dot $d_j \subset D_n$. If $\hat{v} \cdot \hat{v} > 0.8$, then it removes the furthest of $d_i$ and $d_j$ from the set $D_n$.

The routine assigns blend values to reference markers based on the distance of the marker from the grid point p. If the dot is not in $D_n$ then its corresponding value is 0. For the dots in $D_n$ let $$l_i = \frac{1.0}{\|d_i - p\|}.$$

Then the corresponding 's are $$\alpha_i = \frac{l_i}{\sum_{d_i \in D_n} l_i}.$$

Next, the routine filters the blend coefficients for the grid points. For each grid point, it finds the closest grid points using the above routine (replacing the dots with the grid points). The outlining grid points are treated as a special case; they are only blended with other outlining grid points. The new blend coefficients are found by weighting the blend coefficient of the grid point by 0.75 and weighting the average of the blend coefficients of neighboring grid point by 0.25. More formally, let $g_i = [\alpha_0, \ldots, \alpha_n]$ be the vector of blend coefficients for the grid point i. Then the new vector $g_i'$ is found as follows, where $N_i$ is the set of neighboring grid points for the grid point i:

$$g_i' = 0.75 g_i + \frac{0.25}{\|N_i\|} \sum_{j \in N_i} g_i$$

The routine applies this filter twice to simulate a wide low pass filter.

Assigning Blends to the Vertices

As shown in FIG. 16, the process of assigning blend coefficients from the grid points to the vertices includes the following steps: 1) finding the grid point with the same label as the vertex (200); and 2) copying the blend coefficient of this grid point to the vertex (202).

The only exception to this process is the vertices for the polygons inside of the mouth. For these vertices, we take beta of the closest grid point on the top lip and 1.0-beta of the closest grid point on the bottom lip. In the initial implementation, we used beta values of 0.8, 0.6, 0.4, 0.25, and 0.1 from top to bottom of the mouth polygons.

Removal of the Markers from the Video Frames

Before the textures are created from the video sequences, the reference markers and their associated illumination effects are removed from the camera images. When using fluorescent markers, interreflection effects may be noticeable because some parts of the face fold dramatically, bringing the reflective surface of some markers into close proximity with the skin. This is an issue along the nasolabial furrow where diffuse interreflection from the colored dots onto the face can significantly alter the skin color.

The reference markers can be removed from each of the camera image sequences by substituting a texture of surrounding pixels to the pixels covered by reference markers. For example, the markers can be removed by substituting the covered pixels with a skin texture. Our initial implementation also removes diffuse interreflection effects and remaining color casts from stray pixels that have not been properly substituted.

Figure 17:
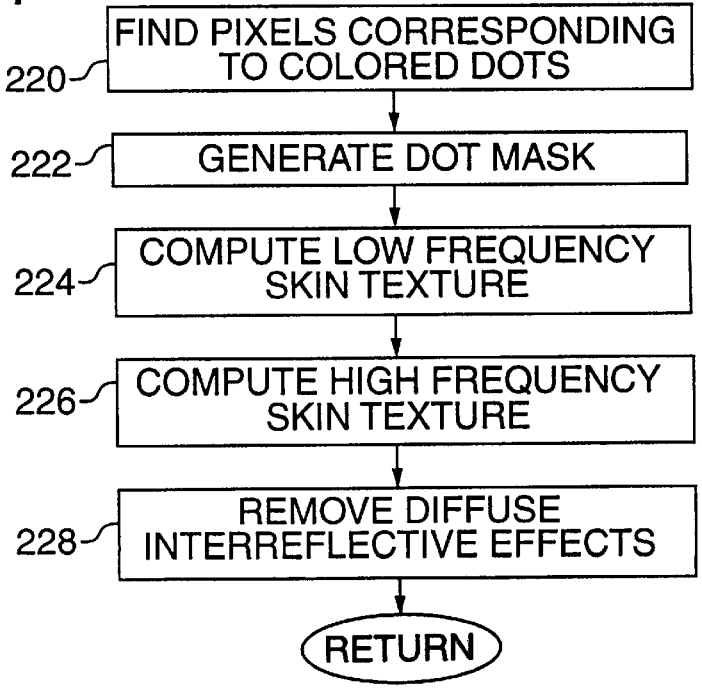
FIG. 17 is a flow diagram illustrating a process used to remove reference markers from the camera images in the initial implementation.

FIG. 17 is a flow diagram illustrating a process used to remove reference markers from the camera images in the initial implementation. The process begins by finding the pixels that correspond to colored dots (220). The nearest neighbor color classifier used in 2D marker labeling is used to mark all pixels that have any of the dot colors. A special training set is used since in this case false positives are much less detrimental than they are for the dot tracking case. Also, there is no need to distinguish between dot colors, only between dot colors and the background colors. The training set is created to capture as much of the dot color and the boundary region between dots and the background colors as possible.

A dot mask is generated by applying the classifier to each pixel in the image (222). The mask is grown by a few pixels to account for any remaining pixels that might be contaminated by the dot color. The dot mask marks all pixels that must have skin texture substituted.

The skin texture is broken into low spatial frequency and high frequency components (224, 226). The low frequency components of the skin texture are interpolated by using a directional low pass filter oriented parallel to features that might introduce intensity discontinuities. This prevents bleeding of colors across sharp intensity boundaries such as the boundary between the lips and the lighter colored regions around the mouth. The directionality of the filter is controlled by a two dimensional mask which is the projection into the image plane of a three dimensional polygon mask lying on the 3D face model. Because the polygon mask is fixed on the 3D mesh, the 2D projection of the polygon mask stays in registration with the texture map as the face deforms.

Figure 18:
FIG. 18 shows an example of muscles used to surround facial features that tend to introduce intensity discontinuities.

All of the important intensity gradients have their own polygon mask: the eyes, the eyebrows, the lips, and the naso-labial furrows. FIG. 18 shows an example of the masks surrounding facial features that can introduce intensity discontinuities. The 2D polygon masks are filled with white and the region of the image outside the masks is filled with black to create an image. This image is low-pass filtered. The intensity of the resulting image is used to control how directional the filter is. The filter is circularly symmetric where the image is black, i.e., far from intensity discontinuities, and it is very directional where the image is white.

The directional filter is oriented so that its long axis is orthogonal to the gradient of this image. The high frequency skin texture is created from a rectangular sample of skin texture taken from a part of the face that is free of dots. The skin sample is high pass filtered to eliminate low frequency components. At each dot mask pixel location, the high pass filtered skin texture is first registered to the center of the 2D bounding box of the connected dot region and then added to the low frequency interpolated skin texture.

The remaining diffuse interreflection effects are removed by clamping the hue of the skin color to a narrow range determined from the actual skin colors (228). First the pixel values are converted from RGB to HSV space and then any hue outside the legal range is clamped to the extremes of the range. Pixels of the eyes and mouth, found using three of the masks shown in FIG. 18, are left unchanged.

Some temporal variation remains in the substituted skin texture due to imperfect registration of the high frequency texture from frame to frame. A low pass temporal filter is applied to the dot mask regions in the texture images, because in the texture map space the dots are relatively motionless. This temporal filter effectively eliminates the temporal texture substitution artifacts.

Figure 19A:
FIGS. 19A and 19B show an example of a camera image of the actor's face in the test case before and after dot removal.
Figure 19B:
Figure 20A:
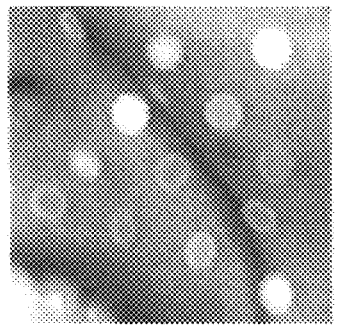
FIGS. 20A–20D show a portion of a camera image in detail during the dot removal process.
Figure 20B:
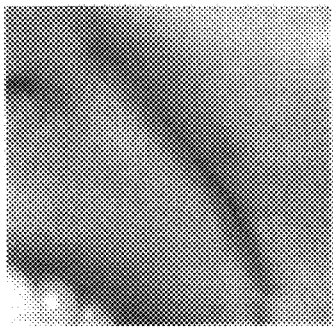
Figure 20C:
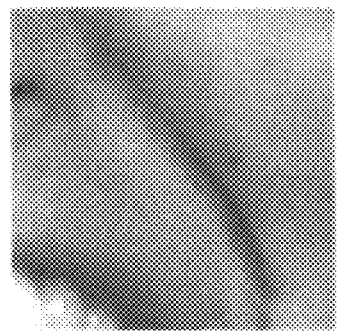
Figure 20D:

FIGS. 19A and 19B show an example of a camera image of a face before and after dot removal. FIGS. 20A–D show a portion of a camera image in detail during steps in the dot removal process: FIG. 20A shows an image of a portion of the face with dots; FIG. 20B shows the same image with the dots replaced by a low frequency skin texture; FIG. 20C shows an image with a high frequency texture added; Finally, FIG. 20D shows the image with the hue clamped as described above.

Creating the Texture Maps

Figure 21:
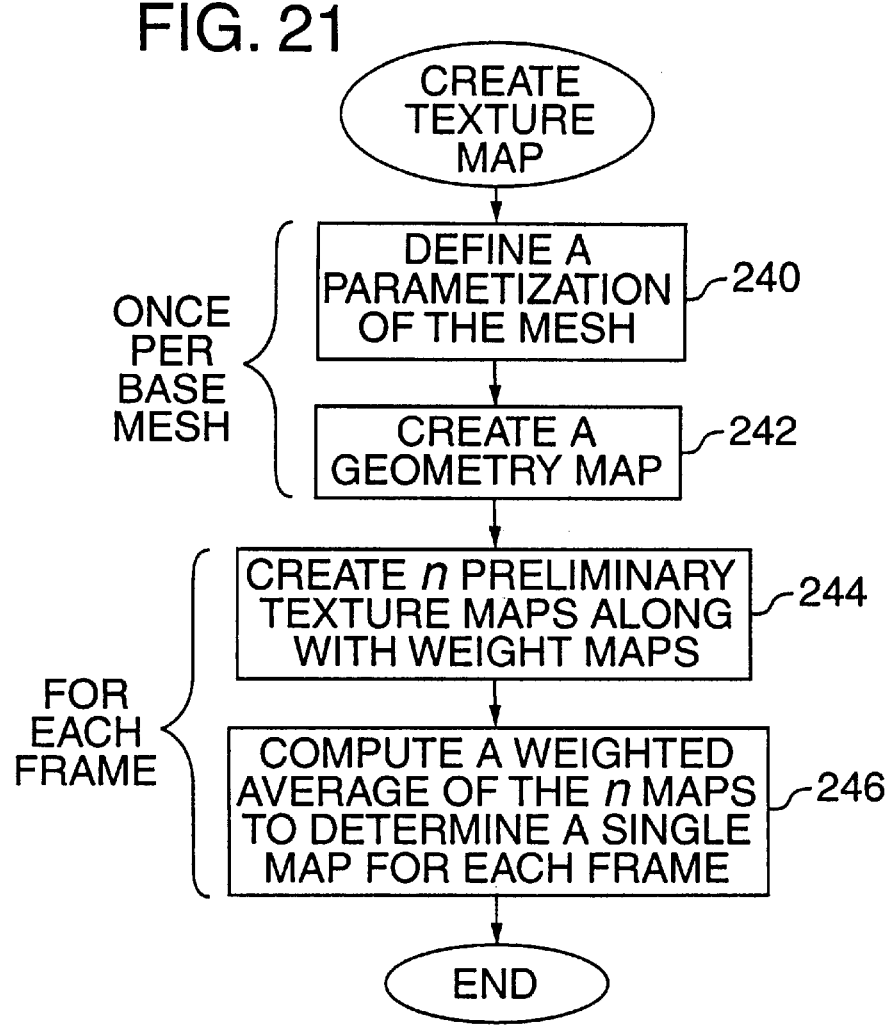
FIG. 21 is a flow diagram illustrating a process for creating texture maps from the camera images captured from each of the video cameras positioned around the actor in the test case.

Our initial implementation creates texture maps for every frame of input video in a four-step process. FIG. 21 is a diagram illustrating the steps in this process. The first two steps are performed only once per mesh. The first step in the creation of the textures is to define a parametrization of the mesh (240). The next step is to create a geometry map containing a location on the mesh for each texel using this parametrization (242). Third, for every frame, our method creates six preliminary texture maps, one from each camera image, along with weight maps (244). The weight maps indicate the relative quality of the data from the different cameras. Fourth, the method computes a weighted average of these texture maps to make a final texture map for each frame (246).

Figure 22A:
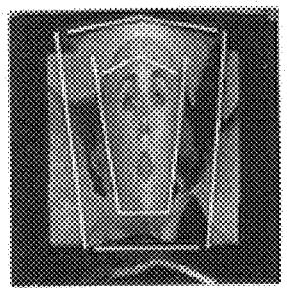
FIG. 22A is an image showing a cylindrical texture map of the actor's face in the test case.
Figure 22B:
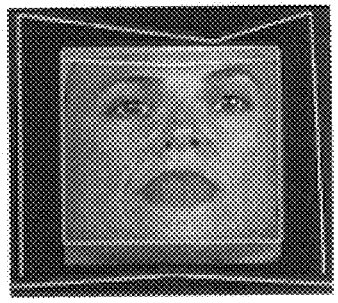
FIG. 22B shows an example of a warped version of the texture map from FIG. 22A that focuses on the face, and particularly on the eyes and mouth. The warp in FIG. 22B is defined by the line pairs shown in white in FIG. 22A.

We create an initial set of texture coordinates for the head by tilting the mesh back 10 degrees to expose the nostrils and projecting the mesh vertices onto a cylinder. A texture map generated using this parametrization is shown in FIG. 22A. We specify a set of line pairs and warp the texture coordinates using the technique described by Beier and Neely. See Beier, T., and Neely, S., "Feature-based image metamorphosis," in *Computer Graphics* (*SIGGRAPH '92 Proceedings*)(July 1992), E. E. Catmull, ed., vol. 26, pp. 35–42. This parametrization results in the texture map shown in FIG. 22B. Note that in FIG. 22B, the warped texture map focuses on the face, and particularly the eyes and the mouth. In this example, only the front of the head is textured with data from the six video streams.

Next, the method creates the geometry map containing a mesh location for each texel. A mesh location is a triple $(k, \beta_1, \beta_2)$ specifying a triangle k and barycentric coordinates in the triangle $(\beta_1, \beta_2, 1-\beta_1-\beta_2)$. To find the triangle identifier k for texel (u,v), our method exhaustively searches through the mesh's triangles to find the one that contains the texture coordinates (u,v). The method then sets the $\beta_i$ s to be the barycentric coordinates of the point (u,v) in the texture coordinates of the triangle k. When finding the mesh location for a pixel, a previous search has already found the triangles in which its neighbors above and to the left lie. Therefore, the method is optimized so that it first searches through these triangles and their neighbors. However, the time required for this task is not critical as the geometry map need only be created once.

Next, our method creates preliminary texture maps for frame f one for each camera. This is a modified version of the technique described in Pighin, F., Auslander, J., Lishinski, D., Szeliski, R., and Salesin, D., "Realistic facial animation using image based 3d morphing," Tech. Report TR-97-01-03, Department of Computer Science and Engineering, University of Washington, Seattle, Wash., 1997. To create the texture map for camera c, the method begins by deforming the mesh into its frame f position. Then, for each texel, it finds its mesh location, $(k, \beta_1, \beta_2)$, from the geometry map. With the 3D coordinates of triangle k's vertices and the barycentric coordinates $\beta_i$ s, the method computes the texel's 3D location t. The method transforms t by camera c's projection matrix to obtain a location, (x,y), on camera c's image plane. The method then colors the texel with the color from camera c's image at (x,y).

Figure 23:
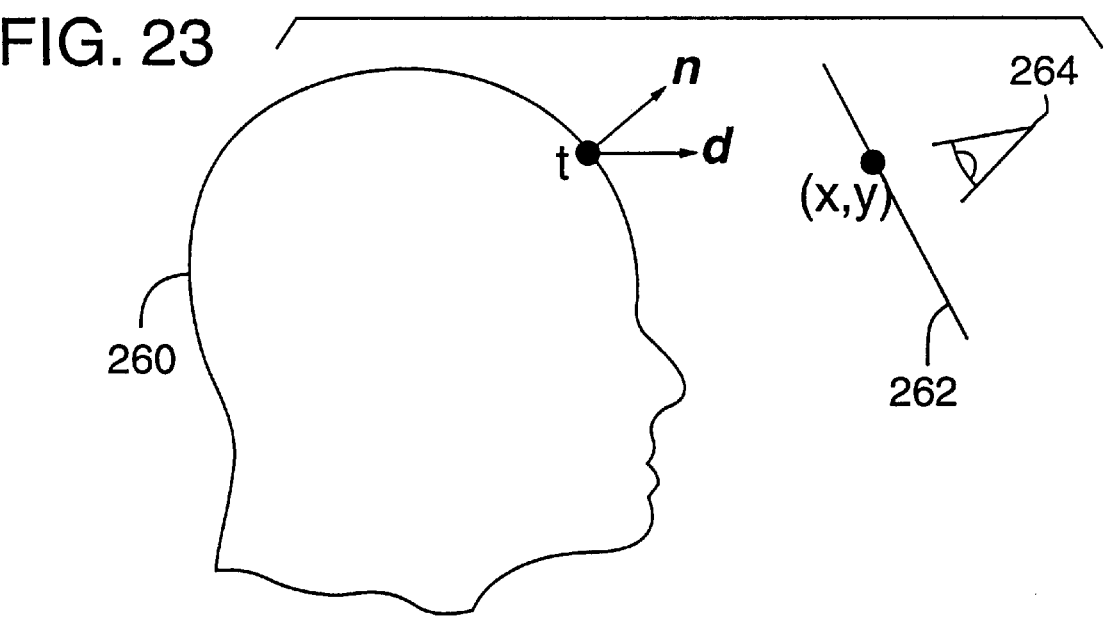
FIG. 23 is a diagram illustrating a simple 2D example of a model of a human head to show how the weight of each texel is computed based on the relationship between the surface normal n the direction to the camera d at the texel.

FIG. 23 is a diagram illustrating a simple 2D example of a model of a human head (260) to show how a texel's weight is computed based on its relationship between the surface normal n and the direction to the camera d at the texel. The image plane of the camera is represented by the line (262) between the eyepoint (264) and the head (260). The method sets the texel's weight to the dot product of the mesh normal n, at texel t with the direction back to the camera, d. Negative values are clamped to zero. Hence, weights are low where the camera's view is glancing. This weight map is not smooth at triangle boundaries, but can be smoothed by convolving it with a gaussian kernel.

Last, the method merges the six preliminary texture maps. As they do not align perfectly, averaging them blurs the texture and loses detail. Therefore, in our test case, we used only the texture map of the bottom, center camera for the center 46% of the final texture map. The method smoothly transitions (over 23 pixels) using a weighted average of each preliminary texture map at the sides.

FIGS. 24A–B and 25A–D show examples of texture maps generated with our initial implementation for the test case. FIGS. 24A and 24B show camera views and their corresponding texture maps for frame numbers 451 and 1303, respectively. FIGS. 25A, 25B, 25C and 25D show camera views and corresponding textures for frame numbers 0, 1000, 2000 and 3000 respectively.

In the examples shown in FIGS. 24 and 25, the texture maps do not cover parts of the actor's head. In our test case, we simulated these uncovered portions with the captured reflectance data from the Cyberware scan, modified in two ways. First, we replaced the mesh's ears with ears from a stock mesh, and moved the ears in the texture to achieve better registration. Second, we set the alpha channel to zero (with a soft edge) in the region of the texture for the front of the head. Then we rendered in two passes to create an image of the head with both texture maps applied.

Compression

The geometric and texture map data have different statistical characteristics and therefore, it is more effective to compress them separately. The geometric data includes the base model and 3D positions used to move the base 3D model to create animation. There are a number of different ways to store the 3D geometric motion data. The 3D motion of reference markers can be stored, along with references between the reference markers and the vertices of the base model. Alternatively, the 3D geometric motion of selected mesh vertices can be stored. In either case, the geometric motion is represented as the motion of selected 3D points, having positions that change over time (e.g., a new 3D position for each frame).

The motion of the selected 3D points can be represented in a variety of ways as well. One approach is to represent this motion as a series of deformation vectors that define the motion of the 3D points. These deformation vectors can represent the incremental change in position from one instant in time to another or from a reference frame to a current frame.

The texture map data can be represented as a sequence of images that are associated with 3D geometric motion data. The implementation detailed above is designed to compute a texture for each frame of a video sequence captured of the actor, and each texture is associated with 3D geometric data describing the position of the 3D geometric model of the actor at a particular time. However, it is not an absolute requirement that 1) textures be created from each frame of the input video sequence and 2) each instance of 3D motion data correspond to a different texture map. Preferably, each instance of the geometric motion data should be associated with a texture that corresponds to the deformation at that instance. This does not preclude a texture from being indexed to more than one set of deformation vectors.

We found that there is significant long-term temporal correlation in the geometric motion data since similar facial expressions occur throughout the sequence. The short term correlation of the texture data is significantly increased over that of the raw video footage because in the texture image space the markers are essentially motionless. This eliminates most of the intensity changes associated with movement and leaves primarily shading changes. Shading changes tend to have low spatial frequencies and are highly compressible. Compression schemes such as MPEG2 or MPEG4, which can take advantage of short term temporal correlation, can exploit this increase in short term correlation.

Compression of the Geometric Data

For the geometric data, one way to exploit the long term correlation is to use principal component analysis. As explained above, the geometric data used to define the motion of the 3D model can be represented as a series of deformation vectors for 3D reference points associated with the 3D model. The deformation vectors can be represented in matrix form—e.g., the columns of the matrix correspond to intervals of time and the rows correspond to deformation vectors for the 3D reference points. This matrix can be coded efficiently by decomposing the matrix into basis vectors and coefficients. The coefficients can be coded using temporal prediction. Quantization and entropy coding can also be used to code the basis vectors and coefficients.

Figure 26:
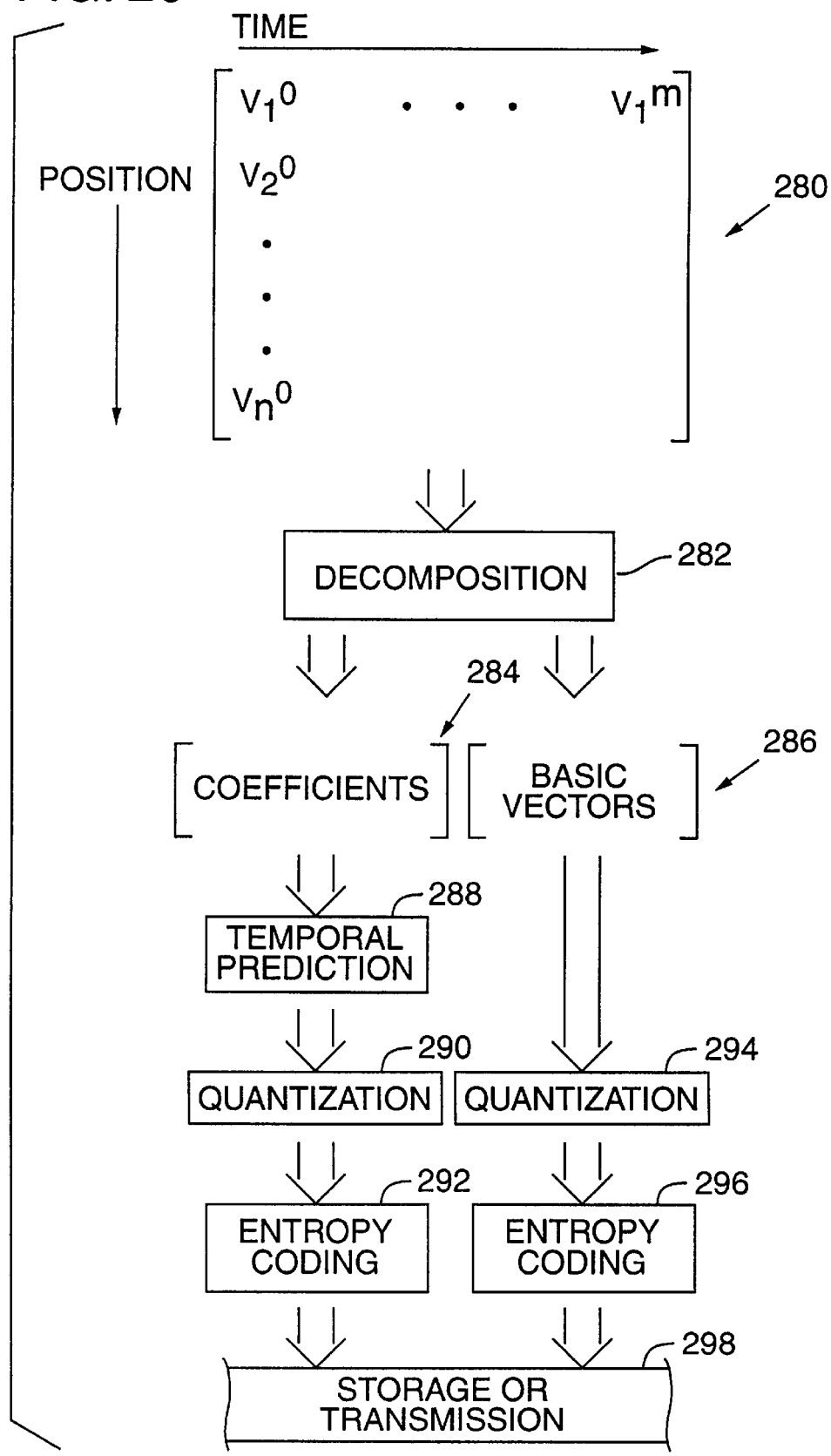
FIG. 26 is a diagram illustrating how a matrix of geometric motion data can be coded in the format that is more efficient to store and transmit.

FIG. 26 is a diagram illustrating how a matrix of deformation vectors can be coded in a format that is more efficient to store and transmit. The geometric data is represented as a matrix of deformation vectors (280). In this particular example, the columns correspond to increments of time such as frames in an animation sequence. The rows correspond to 3D vectors that define the position of a corresponding 3D reference point.

The decomposition block (282) is a module for decomposing the matrix into coefficients (284) and basis vectors (286). The temporal prediction block (288) represents a module for performing temporal prediction among the columns in the coefficient matrix. The coefficients and basis vectors can be compressed using quantization and entropy coding as shown in the quantization and entropy coding modules (290, 292, 294, and 296). In the case of the coefficients, prediction can be performed on the matrix of coefficients before or after quantization of the coefficients. Depending on the form of the geometric data and matrix used to store it, it is possible to use prediction on either the columns or the rows of the coefficient matrix.

The output of the entropy coding modules (292, 296) is transferred to a transmitter or a storage device such as a hard disk. In some applications, the deformation vectors are computed, possibly in response to some form of input, and coded for transmission. The "transmitter" refers to the system software and hardware used to transmit the coded data over some form of communication medium such as a computer network, a telephone line, or serial communication link. The manner in which the compressed geometry data is transferred depends on the communication medium.

In other applications not requiring immediate transfer of the deformation data, the compression of the deformation vectors still provides advantages. Specifically, the compressed data requires less storage space and reduces memory bandwidth requirements.

There are a variety of methods for decomposing a matrix into basis vectors and coefficients. Below, we describe one example of how principal component analysis can be applied to compress a matrix representing time varying position of the 3D model.

If we represent our dataset as a matrix A, where frame i of the data maps column i of A, then the first principal component of A is $$\max_u (A^T u)^T (A^T u).$$

The u that maximizes the above-equation is the eigenvector associated with the largest eigenvalue of $AA^T$ which is also the value of the maximum. Succeeding principal components are defined similarly, except that they are orthogonal to all preceding principal components, i.e., $u_i^T u_j = 0$ for $j \neq i$. The principal components form an orthonormal basis set represented by the matrix U where the columns of U are the principal components of A ordered by eigenvalue size with the most significant principal component in the first column of U.

The data in the A matrix can be projected onto the principal component basis as follows:

$$W = U^T A$$

Row i of W is the projection of column $A_i$ onto the basis vector $u_i$. More precisely, the jth element in row i of W corresponds to the projection of frame j of the original data onto the ith basis vector. We call the elements of the W matrix projection coefficients.

Similarly, A can be reconstructed exactly from W by multiplication by the basis set:

$$A = UW.$$

The most important property of the principal components for our purposes is that they are the best linear basis set for reconstruction in the $l_2$ norm sense. For any given matrix $U_k$, where k is the number of columns of the matrix and k<rank(A), the reconstruction error $$e = \|A - U_k U_T^k A\|_2^F$$

where $\|A\|_2^F$ is the Frobenius norm defined to be $$\|A\|_F^2 = \sum_{i=1}^{m} \sum_{j=1}^{n} a_{ij}^2$$

will be minimized if $U_k$ is the matrix containing the k most significant principal components of A.

We can compress a data set A by quantizing the elements of its corresponding W and U matrices and entropy coding them. Since the compressed data cannot be reconstructed without the principal component basis vectors, both the W and U matrices have to be compressed. The basis vectors add overhead that is not present with basis sets that can be computed independent of the original data set, such as the DCT basis.

For data sequences that have no particular structure, the extra overhead of the basis vectors would probably outweigh any gain in compression efficiency. However, for data sets with regular frame to frame structure, the residual error for reconstruction with the principal component basis vectors can be much smaller than for other bases. This reduction in residual error can be great enough to compensate for the overhead bits of the basis vectors.

The principal components can be computed using the singular value decomposition (SVD) method described in Strang, *Linear Algebra and its Application*, HBJ, 1988. Efficient implementations of this algorithm are widely available. The SVD of a matrix A is $$A = U \Sigma V^T$$

where the columns of U are the eigenvectors of $A A^T$ the singular values, $\Sigma_i$, along the diagonal matrix $\Sigma$ are the square roots of the eigenvalues of $A A^T$ and the columns of V are the eigenvectors of $A^T A$. The ith column of U is the ith principal component of A. Computing the first k left singular vectors of A is equivalent to computing the first k principal components.

While we have illustrated one type of principal component analysis, other forms of principal component analysis can be used to compress geometry data. Another form of principal component analysis if referred to as the KL transform (Karhunen-Loeve).

Compression of Deformation Vectors of 3D Markers

The geometric data has the long term temporal coherence properties mentioned above since the motion of the face is highly structured. In our test case, the overhead of the basis vectors for the geometric data is fixed because there are only 182 markers on the face. The maximum number of basis vectors is 182*3 since there are three numbers, x, y, and z, associated with each marker. The basis vector overhead steadily diminishes as the length of the animation sequence increases.

The geometric data is mapped to matrix form by taking the 3D offset data for the ith frame and mapping it the ith column of the data matrix $A_g$. The projection coefficients are stored in the matrix $W_g$.

There is significant correlation between the columns of projection coefficients because the motion of the 3D reference points is relatively smooth over time. We can reduce the entropy of the quantized projection coefficients by temporally predicting the projection coefficients in column i from column i-1, i.e., $c_{i-1} + \Delta_i$ where we encode. To compress the dataset in our test case, we used uniform quantization to quantize the coefficients and then used temporal prediction to compress them further. As noted below, other forms of quantization may be used as well.

Figure 27:
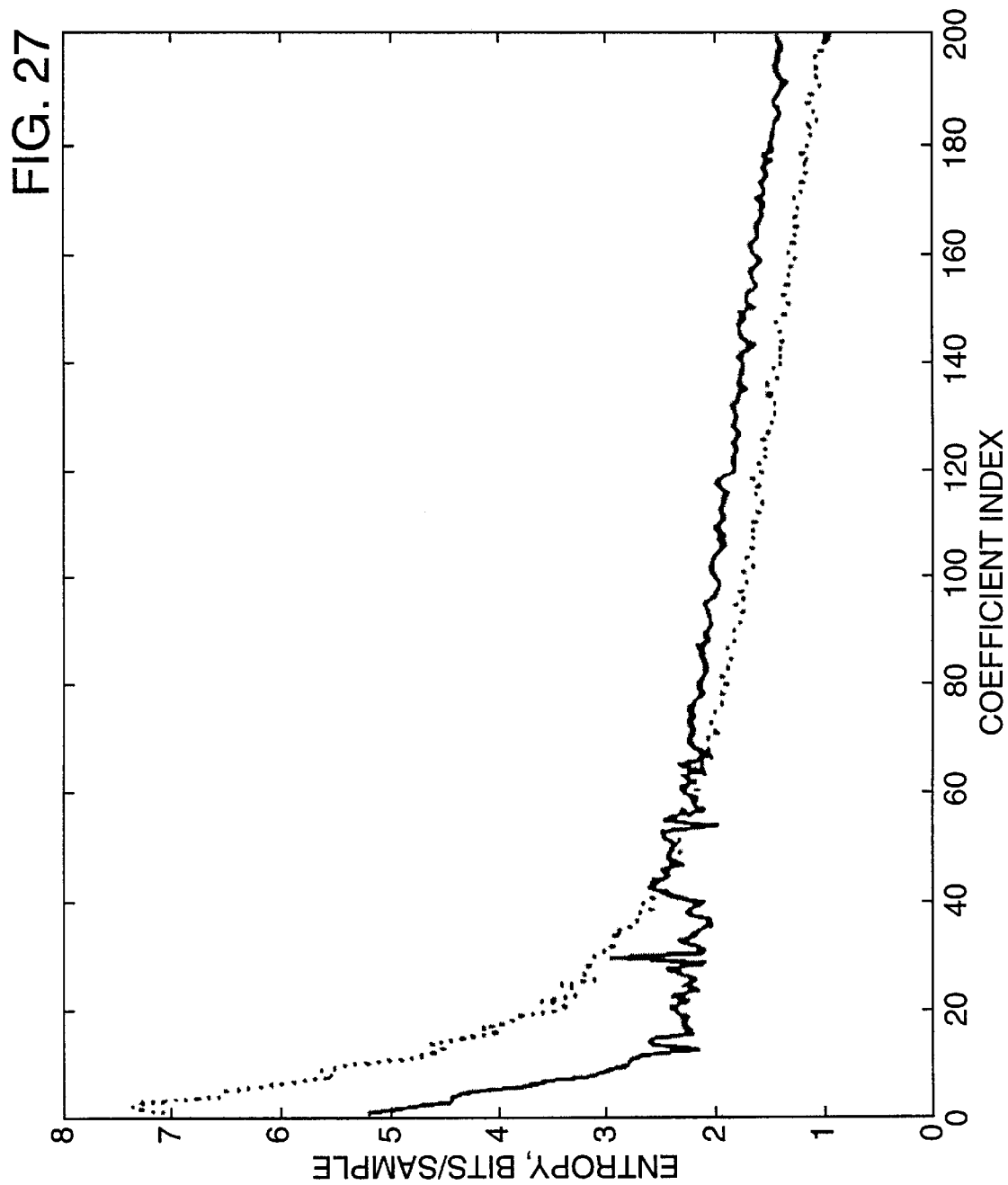
FIG. 27 shows a graph illustrating the effectiveness of temporal prediction on the compression of geometric motion data.

For our data set, only the projection coefficients associated with the first 45 principal components, corresponding to the first 45 rows of $W_g$, have significant temporal correlation so only the first 45 rows are temporally predicted. The remaining rows are entropy coded directly. After the temporal prediction, the entropy is reduced by about 20 percent in our test case. FIG. 27 shows a graph illustrating how temporal prediction of the first 45 coefficients reduced their entropy. The vertical axis represents entropy in bits per sample, and the horizontal axis represents the coefficient index. In this case, each coefficient is a sample. The dotted line is a plot of the entropy of the coefficients without prediction, and the solid line is a plot of the entropy of the coefficients with prediction.

As noted above, the basis vectors can be compressed further by quantizing them. In our implementation, the basis vectors are compressed by choosing a peak error rate and then varying the number of quantization levels allocated to each vector based on the standard deviation of the projection coefficients for each vector. This form of quantization is sometimes referred to as scalar quantization (SQ). SQ is a quantization method that involves converting real numbers to integers via rounding. In SQ, a rounding function (e.g., round(.)) converts a real number to an integer as in the following examples: the number 4.73 is approximated by round(4.73)=5, the number 3.21 is approximated by round (3.21)=3, and the number −6.1 is approximated by round(− 6.1)=−6. Note that rounding has an approximation error that varies between −0.5 and 0.5, i.e. its maximum absolute value is 0.5. The possible values of the round(.) function are also called quantization levels.

Consider an example where $x_i$ is the ith coordinate of a basis vector, and i varies from 1 to N, where N is the number of all coordinates in all vectors. An example of an SQ method is as follows:

1) Look at all $x_i$ (i.e. for i=1, 2, . . . , N), and call V their maximum absolute value; i.e. $V = \max\{|x_i|\}$, for all i.
2) Set a maximum relative error (the "peak error rate") d. For example, d=0.001 means a maximum relative error of 0.1%.

3) Scale all $x_i$ by a "gain" factor A, with A=0.5/(d*V), i.e. compute $y_i=A*x_i$, for all i.
4) Now quantize the values by rounding to the nearest integer: $u_1$=round($y_i$), for all i.
5) Scale back the quantized values by the inverse of A, i.e. compute $v_i=u_i/A$, for all i.

Note that the quantized $v_i$ values are now an approximation to the original values $x_i$. The quality of the approximation is controlled by the parameter d, because the maximum relative error satisfies max($|x_i-v_i|$)/max$\{|x_i|\}$<=d.

Note that there is a one-to-one relationship between the $v_i$ and the $u_i$. Since the $u_i$ are integers, they are represented with a finite number of bits. Furthermore, the $u_i$ with small values need fewer bits than those with large values.

Finally, for a given set of images, the values $u_i$ for the vector will have a non-uniform probability distribution. For example, because many of the values of $y_i$ are typically very small, many of the values of $u_i$ will be zero. Quantization, thus, allows the quantized data to be compressed more efficiently via an entropy coder, which assigns code words to each value based on their probability of occurrence. The graph in FIG. 27 shows the entropy (the average number of bits per coefficient) for such coders.

Alternative forms of quantization can be used. For example, the numbers $x_i$ could be grouped into small vectors (e.g., groups of M=4 or M=8 values), and then compressed using vector quantization (VQ). In VQ, a vector is approximated by its nearest neighbor in a regular or irregular lattice of points in the M-dimensional space.

In practice, for the data generated in our test case, there would be little improvement in using VQ—maybe 20% better compression at most.

As noted, the predicted coefficients and quantized basis vectors can be compressed further using entropy coding such as arithmetic or Huffman coding. Entropy coding compresses the geometric data further by assigning shorter codes to samples that occur more frequently and longer codes to samples that occur less frequently.

We visually examined animation sequences with $W_g$ compressed at a variety of peak error rates. The entropy of $W_g$ for an error level of about 0.001 or 0.002 is 36 kbits/sec and the entropy of $U_g$ is 13 kbits/sec for a total of 40 kbits/sec for all the geometric data. These values are averages for our 3330 frame animation second sequence.

Decompression

The texture and geometry data are transmitted and decoded separately. The texture data is decoded using an appropriate MPEG decoder compatible with the format of the compressed texture data. The MPEG decoder reconstructs each texture map as if it were a frame in a video sequence. The deformation vectors associated with a particular frame of an animation sequence have a reference to the appropriate texture map. Thus, once decompressed, the texture maps are accessed as necessary to render the frames in an animation sequence.

The geometry data is decoded by performing the coding steps in reverse. First, an entropy decoder reconstructs the basis vectors and coefficients from the variable length codes. Next, the coefficients are reconstructed from the predicted coefficients.

An inverse quantizer then restores the coefficients and basis vectors. The original matrix of deformation vectors is then reconstructed from the basis vector and coeffient matrices.

Applications

The methods described above can be used to create realistic virtual models of complex, animated objects, namely, human facial features. Once the virtual model is captured, it can be used in a variety of applications. For example, the model can be compressed and distributed on a memory device (e.g., CDROM) or via a network. A user can retrieve the model from the memory device or network and use local rendering hardware and software to render the model in any position in a virtual environment, from any virtual camera viewpoint. In our test case, we used a personal computer from Gateway having a 200 mHz Pentium Proprocessor from Intel. The computer was equipped with a Millennium graphics card from Matrox Graphics and employed essentially no hardware acceleration of 3D graphics rendering functions.

A conventional 3D rendering system can be used to generate a variety of different synthetic animation sequences based on the 3D model and corresponding textures. For example, a database of facial-expressions can be stored on a user's computer. Using the above method, each facial expression is defined in terms of a series of time-varying deformation vectors and corresponding textures. To create an animation, the rendering system retrieves and renders the deformation vectors and textures for a selected facial expression.

During the rendering process, the mesh vertices are deformed as described above in the section on moving the mesh. Each vertex is offset by a linear combination of the offsets of some set of dots. The deformation vectors are always ordered in the same way—dot 0, dot 1 . . . etc., for frame 0–n. The blend coefficients for the mesh vertices and the curves are computed once and stored in their own file. The textures are stored as frame 0–n, so the texture map and the deformation vectors are accessed by selecting the vectors and texture for the current frame.

Figure 28:
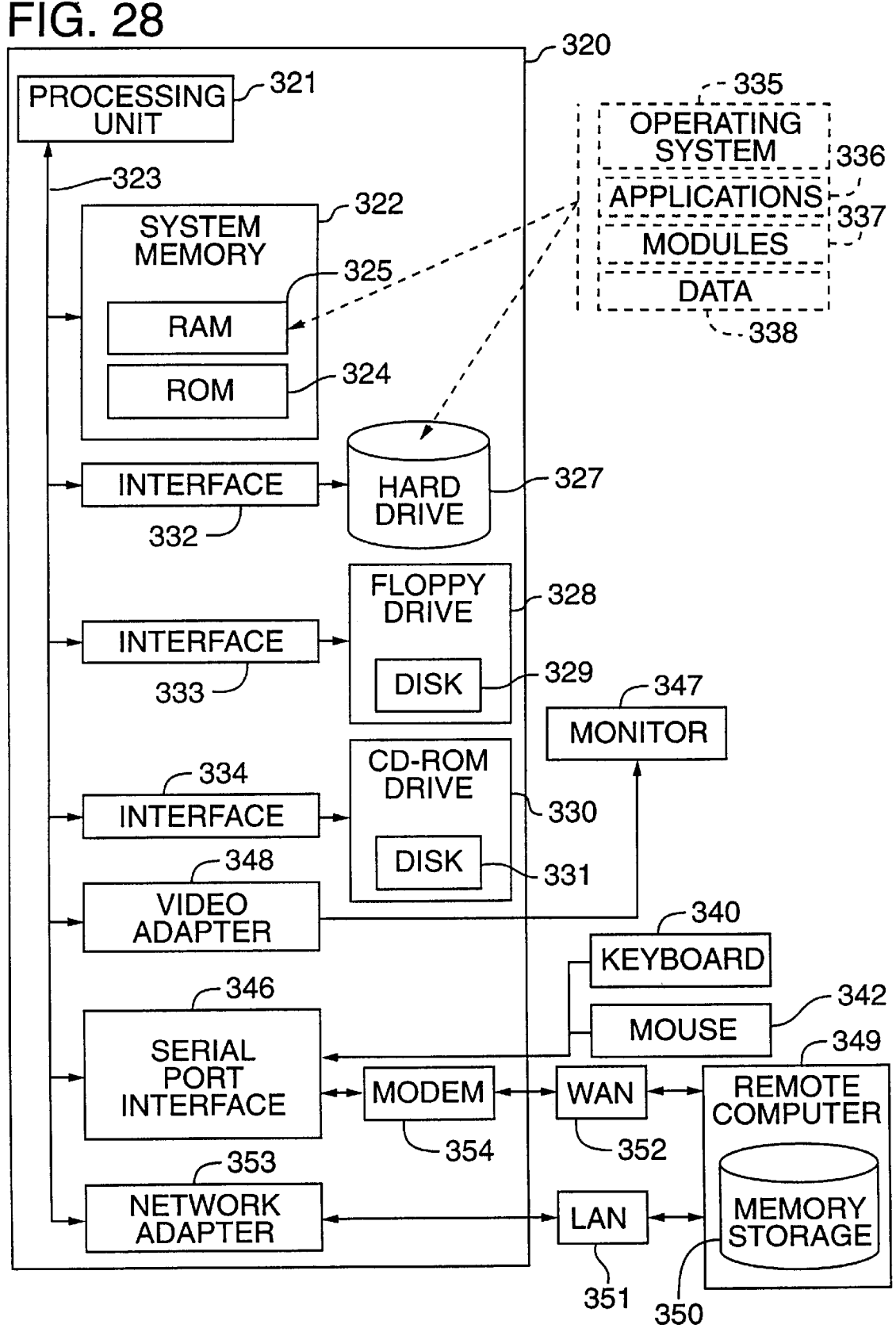
FIG. 28 shows an example of a computer system that may be used as an operating environment for the invention.

FIG. 28 and the following discussion are intended to provide a brief, general description of a suitable computing environment in which the software routines described above can be implemented.

FIG. 28 shows an example of a computer system that may be used as an operating environment for the invention. The computer system includes a conventional computer 320, including a processing unit 321, a system memory 322, and a system bus 323 that couples various system components including the system memory to the processing unit 321. The system bus may comprise any of several types of bus structures including a memory bus or memory controller, a peripheral bus, and a local bus using any of a variety of conventional bus architectures such as PCI, VESA, Microchannel, ISA and EISA, to name a few. The system memory includes read only memory (ROM) 324 and random access memory (RAM) 325. A basic input/output system 326 (BIOS), containing the basic routines that help to transfer information between elements within the computer 320, such as during start-up, is stored in ROM 324. The computer 320 further includes a hard disk drive 327, a magnetic disk drive 328, e.g., to read from or write to a removable disk 329, and an optical disk drive 330, e.g., for reading a CD-ROM disk 331 or to read from or write to other optical media. The hard disk drive 327, magnetic disk drive 328, and optical disk drive 330 are connected to the system bus 323 by a hard disk drive interface 332, a magnetic disk drive interface 333, and an optical drive interface 334, respectively. The drives and their associated computer-readable media provide nonvolatile storage of data, data structures, computer-executable instructions, etc. for the computer 320. Although the description of computer-readable media above refers to a hard disk, a removable magnetic disk and a CD, other types of media which are readable by a computer, such as magnetic cassettes, flash memory cards, digital video disks, Bernoulli cartridges, and the like, may also be used in this computing environment.

A number of program modules may be stored in the drives and RAM 325, including an operating system 335, one or more application programs (such as the routines of the facial animation and coding methods detailed above) 336, other program modules 337, and program data 338 (the video sequences, the base mesh, 2D and 3D locations of reference markers, deformation vectors, etc.). A user may enter commands and information into the computer 320 through a keyboard 340 and pointing device, such as a mouse 342. Other input devices (not shown) may include a microphone, joystick, game pad, satellite dish, scanner, or the like. These and other input devices are often connected to the processing unit 321 through a serial port interface 346 that is coupled to the system bus, but may be connected by other interfaces, such as a parallel port, game port or a universal serial bus (USB).

A monitor 347 or other type of display device is also connected to the system bus 323 via an interface, such as a video controller 348. The video controller manages the display of output images generated by the rendering pipeline by converting pixel intensity values to analog signals scanned across the display. Some graphics workstations include additional rendering devices such as a graphics accelerator that plugs into an expansion slot on the computer or a graphics rendering chip set that is connected to the processor and memory via the bus structure on the mother board. Such graphics rendering hardware accelerates image generation, typically by using special purpose hardware to scan convert geometric primitives such as the polygons of the base mesh.

The computer 320 may operate in a networked environment using logical connections to one or more remote computers, such as a remote computer 349. The remote computer 349 may be a server, a router, a peer device or other common network node, and typically includes many or all of the elements described relative to the computer 320, although only a memory storage device 350 has been illustrated in FIG. 29. The logical connections depicted in FIG. 29 include a local area network (LAN) 351 and a wide area network (WAN) 352. Such networking environments are commonplace in offices, enterprise-wide computer networks, intranets and the Internet.

When used in a LAN networking environment, the computer 320 is connected to the local network 351 through a network interface or adapter 353. When used in a WAN networking environment, the computer 320 typically includes a modem 354 or other means for establishing communications over the wide area network 352, such as the Internet. The modem 354, which may be internal or external, is connected to the system bus 323 via the serial port interface 346. In a networked environment, program modules depicted relative to the computer 320, or portions of them, may be stored in the remote memory storage device. The network connections shown are just examples and other means of establishing a communications link between the computers may be used.

Results Achieved in Initial Implementation

Figure 29:
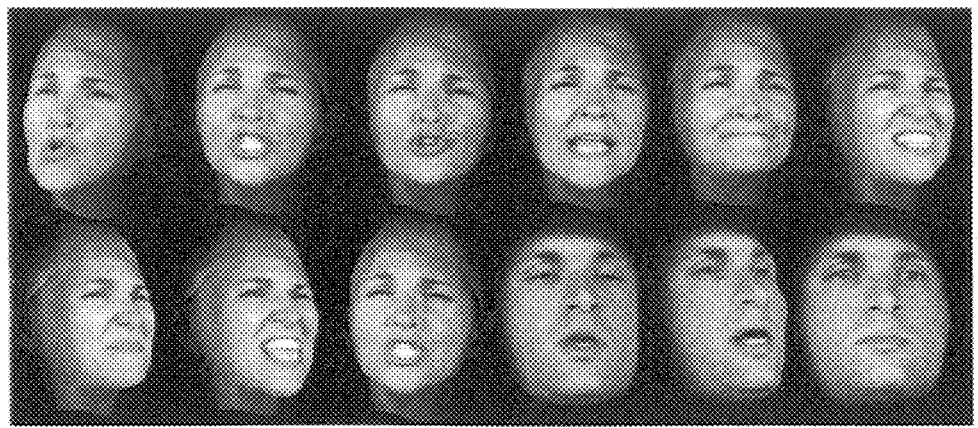
FIG. 29 shows a sequence of rendered images of a textured mesh created from the test case geometric and texture data.

FIG. 29 shows some typical frames from a reconstructed sequence of 3D facial expressions. These frames are taken from a 3330 frame animation in which the actor makes random expressions while reading from a script. The rubber cap on the actor's head was used to keep her hair out of her face.

The facial expressions look remarkably life-like. The animation sequence is similarly striking. Virtually all evidence of the colored markers and diffuise interreflection artifacts is gone, which is surprising considering that in some regions of the face, especially around the lips, there is very little of the actress' skin visible—most of the area is covered by colored markers.

Both the accurate 3D geometry and the accurate face texture contribute to the believability of the reconstructed expressions. Occlusion contours look correct and the subtle details of face geometry that are very difficult to capture as geometric data show up well in the texture images. Important examples of this occur at the nasolabial furrow, which runs from just above the nares down to slightly below the lips. Forehead furrows and wrinkles also are captured. To recreate these features using geometric data rather than texture data would require a detailed 3D capture of the face geometry and a resulting high polygon count in the 3D model. In addition, shading these details properly if they were represented as geometry would be difficult since it would require computing shadows and possibly even diffuse interreflection effects in order to look correct. Subtle shading changes on the smooth parts of the skin, most prominent at the cheekbones, are also captured well in the texture images.

There are still visible artifacts in the animation, some of which are polygonization or shading artifacts, others of which arise because of limitations in our current implementation.

Some polygonization of the face surface is visible, especially along the chin contour, because the front surface of the head contains only 4500 polygons. This is not a limitation of the implementation—we chose this number of polygons because we wanted to verify that believable facial animation could be done at polygon resolutions low enough to potentially be displayed in real time on inexpensive ($200) 3D graphics. For film or television work, where real time rendering is not an issue, the polygon count can be made much higher and the polygonization artifacts will disappear. As graphics hardware becomes faster, the differential in quality between offline and online rendered face images will diminish.

Some artifacts can be addressed by making minor changes to the implementation. For example, occasionally the edge of the face, the tips of the nares, and the eyebrows appear to jitter. This usually occurs when dots are lost, either by falling below the minimum size threshold or by not being visible to three or more cameras. When a dot is lost, the initial implementation synthesizes dot position data that is usually incorrect enough that it is visible as jitter. More cameras, or better placement of the cameras, would eliminate this problem. However, overall the image is extremely stable.

Another implementation artifact that becomes most visible when the head is viewed near profile is that the teeth and tongue appear slightly distorted. This can be addressed using different 3D models. In the initial implementation, the texture map of the teeth and tongue is projected onto a sheet of polygons stretching between the lips. It is possible that the teeth and tongue could be tracked using more sophisticated computer vision techniques and then more correct geometric models could be used.

The use of synthetic shading models on portions of the 3D model can enhance the realism of the resulting animation. Shading effects due to highlights on the eyes may be corrected by building a 3D eye model and creating synthetic highlights appropriate for the viewing situation. Skin shading can be modeled using skin reflectance models. Self-shadowing artifacts can be addressed by improving rendering performance, and in particular, improving rendering performance so that the shadowing effect of area light sources can be adequately modeled. When shading and self shadowing effects are addressed through the use of 3D models and improved rendering performance, facial animation can be created without capturing the live video sequence—only the 3D geometric data and skin reflectance properties will be needed.

Figure 30:
FIG. 30 shows three different versions of a rendered image of a textured mesh: The image on the left was rendered using uncompressed textures, the image in the middle was rendered with textures compressed to 400 kbits/sec., and the image on the right was rendered with textures compressed to 200 kbits/sec.

The compression achieved by the initial implementation is sufficient to enable it to be used effectively in limited bandwidth and real time applications. FIG. 30 shows a series of reconstructed frames. The frame on the left shows a frame reconstructed with a mesh and uncompressed textures. The frame in the middle is the same frame compressed by the MPEG4 codec at 460 kbits/sec. Finally, the frame on the right is the same frame compressed by the MPEG4 codec at 240 kbits/sec. All of the images look quite good. The animated sequences also look good, with the 240 kbits/sec sequence just beginning to show noticeable compression artifacts. The 240 kbits/sec video is well within the bandwidth of single speed CDROM drives. This data rate is low enough that decompression can be performed in real time in software on currently available personal computers. Thus, the approach described above has potential for real time display of the resulting animations.

Compression of the geometric data can be improved by improving the mesh parameterization of the eyes, which distort significantly over time in the texture map space. Also the teeth, inner edges of the lips, and the tongue could potentially be tracked over time and at least partially stabilized, resulting in a significant reduction in bit rate for the mouth region. Since these two regions account for the majority of the bit budget, the potential for further reduction in bit rate is large.

Conclusion

The system produces remarkably lifelike reconstructions of facial expressions recorded from live actors' performances. The accurate 3D tracking of a large number of points on the face results in an accurate 3D model of facial expression. The texture map sequence captured simultaneously with the 3D deformation data captures details of expression that would be difficult, although not impossible, to capture any other way. By using the 3D deformation information to register the texture maps from frame to frame, the variance of the texture map sequence is significantly reduced. The texture map sequence compresses well while still retaining good image quality. Because the bit overhead for the geometric data is low in comparison to the texture data, one can get a 3D talking head for little more than the cost of a conventional video sequence. Because we have a true 3D model of facial expression, the animation can be viewed from any angle and placed in a 3D virtual environment, making it much more flexible than conventional video.

In view of the many possible implementations of the invention, it should be recognized that the implementation described above is only an example of the invention and should not be taken as a limitation on its scope. Rather, the scope of the invention is defined by the following claims. We therefore claim as our invention all that comes within the scope and spirit of these claims.

We claim:

1. A method for capturing a 3D geometric model of an animated 3D object, and color and shading information of a surface of the animated 3D object, the method comprising:

capturing a base mesh of the 3D object;

capturing n simultaneous video sequences of the animated 3D object with markers applied to the surface of the object from each of n cameras positioned around the 3D object, where n is two or more and the video sequences include n camera images per frame;

determining 3D positions of the markers from the n 2D camera images for frames in the video sequence;

determining an association between the 3D positions of the markers and vertices in the base mesh;

using the 3D positions of the markers to determine motion of the vertices of the base mesh; and constructing a texture map from the n camera images for each of multiple frames in the video sequence.

2. The method of claim 1:

identifying 2D locations of the markers in the n camera images for multiple frames in the video sequences by classifying colors of the markers in color classes, each color class comprising a list of colors associated with a marker color, evaluating color values of pixels in the camera images to determine whether to assign the pixels to a color class, and analyzing groups of adjacent pixels assigned to the same color class to determine whether the groups represent a marker.

3. The method of claim 1 including:

a) identifying the 2D locations of the markers in the n camera images for a frame in the video sequences;

b) determining the correspondence among the markers for the frame using the 2D locations of the markers in each of the n camera images for the frame;

c) determining 3D positions for the markers for the frame using the correspondence among the markers and the 2D locations;

d) repeating steps a) to c) to determine 3D positions for the markers for multiple frames.

4. The method of claim 3 further including:

(e) determining correspondence among the 3D positions of the markers for a first frame and a second frame; and (f) repeating step (e) for additional pairs of frames such that each marker has a corresponding 3D position for each of the multiple frames.

5. The method of claim 1 wherein each of the texture maps has a corresponding set of 3D positions of the markers that define a deformation of the base mesh.

6. The method of claim 5 wherein each of the multiple frames has n 2D camera images, and the texture map and corresponding set of 3D positions for each frame are derived from the n 2D camera images for the frame.

7. The method of claim 5 wherein:

each set of the 3D positions corresponds to one of the frames in the video sequence, each of the sets of 3D positions is used to deform the base mesh to a position of the 3D object at the corresponding frame, and the deformed mesh is used to determine how texels in a texture space for the corresponding frame are transformed to locations in a camera image to determine color values for the texels based on color values of pixels in the camera image located at or near the transformed texels.

8. The method of claim 1 wherein the step of constructing a texture map includes:

computing a preliminary texture map from each of the n camera images; and computing the texture map for the frame as a weighted average of the n preliminary texture maps.

9. The method of claim 8 wherein each of the multiple frames has a corresponding set of 3D positions of the markers, and further including:

using the set of 3D positions for the markers to determine a deformation of the base mesh for the corresponding frame; and using the deformation to determine a mapping of texels in each of the preliminary texture maps to the respective camera images to determine color values for the texels from the camera images.

10. The method of claim 1 further including:

replacing portions of the camera images depicting reference markers with a texture created from an image of a portion of the 3D object not covered by reference marker.

11. The method of claim 1 further including:

representing the motion of the base mesh as sets of deformation vectors, each set of deformation vectors corresponding to a position of the base mesh;

decomposing a matrix of the sets of deformation vectors into basis vectors and coefficients; and coding the basis vectors and coefficients for transmission or storage.

12. The method of claim 11 further including:

performing temporal prediction on the coefficients.

13. The method of claim 11 further including:

quantizing the basis vectors and the coefficients.

14. The method of claim 11 further including:

entropy coding the basis vectors and the coefficients.

15. A method for capturing a 3D geometric motion model of an animated 3D object from video sequences of the animated 3D object with markers applied to the 3D object, taken from n cameras positioned around the 3D object, where n is two or more; the method comprising:

determining 3D positions of the markers from n 2D camera images for frames in the video sequence;

determining an association between the 3D positions of the markers and positions in a base 3D model of the object;

using the 3D positions of the markers to determine motion of the base 3D model; and constructing a texture map from the n camera images for each of multiple frames in the video sequences.

16. The method of claim 15 wherein each of the texture maps is associated with a corresponding set of 3D positions of the markers.

17. The method of claim 16 wherein each texture map and corresponding set of 3D positions of the markers are derived from an associated frame of the video sequences, where each frame of the video sequence includes n camera images.

18. The method of claim 17 wherein the texture maps are created by:

deforming the base model according to the set of 3D positions of the associated frame;

determining a mapping between a location in a camera image and a texel location in texture space using the deformed base model; and assigning a color value to the texel based on a color value of a pixel at or near the location in the camera image.

19. The method of claim 18, further including:

repeating the steps of determining a mapping and assigning a color value for the texels in preliminary texture maps, where each preliminary texture map is derived from a corresponding camera image for the frame; and computing a weighted average of the preliminary texture maps to determine a texture map for the frame.

20. The method of claim 15 further including:

representing the motion of the base model as sets of 3D positions associated with the base model, each set of 3D positions corresponding to a position of the base model;

decomposing a matrix of the sets of 3D positions into basis vectors and coefficients; and coding the basis vectors and coefficients for transmission or storage.

21. A method for generating animation of facial expressions comprising:

retrieving sets of 3D positions of 3D reference points associated with a base 3D model of a face, where the sets of the 3D positions are derived from n camera images of n video sequences simultaneously captured of the face with reference markers applied to the face;

retrieving texture maps, where each texture map is associated with a set of 3D positions and the texture maps are derived from frames of the video sequences;

determining a position of the base 3D model of the face for an output image by deforming the base model according to a first set of 3D positions;

rendering the deformed base model to the output image, including texture mapping a texture map associated with the first set of 3D positions onto the deformed base model; and repeating the rendering step for successive sets of 3D positions to produce a sequence of output images that simulate facial expression.

22. The method of claim 21 wherein each set of 3D positions has a corresponding texture map, and each respective set of 3D positions and corresponding texture map are derived from a single, common frame in the video sequence.

23. The method of claim 22 each set of 3D positions and corresponding texture map are derived from n camera images for the common frame.

24. The method of claim 21 wherein the sets of 3D positions are derived from 2D locations of the reference markers in the n camera images.

25. The method of claim 21 further including:

decompressing coded texture maps using a video decoder to reconstruct a series of the texture maps.

26. The method of claim 21 further including:

reconstructing a matrix of the 3D positions from a matrix of basis vectors and coefficients.

27. The method of claim 26 further including:

reconstructing basis vectors from corresponding samples of quantized and entropy coded basis vectors.

28. The method of claim 26 further including:

reconstructing coefficients from temporally predicted coefficients.

* * * * *

UNITED STATES PATENT AND TRADEMARK OFFICE
CERTIFICATE OF CORRECTION

PATENT NO. : 6,072,496
DATED : June 6, 2000
INVENTOR(S) : Guenter et al.

It is certified that error appears in the above-identified patent and that said Letters Patent is hereby corrected as shown below:

Column 1,
Line 10, "a human" should read -- human --.

Column 2,
Line 58, "characters" should read -- characters --.

The following paragraph should appear after column 3, line 15,
-- The file of this patent contains at least one drawing executed in color. Copies of this patent with color drawings will be provided by the Patent and Trademark Office upon request and payment of the necessary fee. --

Column 4,
Line 44, "Fig. Shows" should read -- Fig. 24B shows --.

Column 7,
Line 35, "5" should read -- 5. --.

Column 14,
Line 27, "$d_j^k$" should read -- $d_k^j$ --.

Line 33, "$p'_j = p_j + \Sigma d_j^k \|d_j^k - d_k\|$" should read -- $p'_j = p_j + \Sigma d_k^j \|d'_k - d_k\|$ --.

Line 35, "$\alpha_j^k s$" should read -- $\alpha_k^j s$ --.

Column 15,
Line 61, "corresponding value" should read -- corresponding α value --.

Column 16,
Line 1, "'s" should read -- α's --.

Column 18,
Line 2, "parametrization" should read -- parameterization --.
Line 5, "parametrization" should read -- parameterization --.

UNITED STATES PATENT AND TRADEMARK OFFICE
CERTIFICATE OF CORRECTION

PATENT NO. : 6,072,496
DATED : June 6, 2000
INVENTOR(S) : Guenter et al.

It is certified that error appears in the above-identified patent and that said Letters Patent is hereby corrected as shown below:

Column 21,
Line 28, "$e=\|A-U_k U_T{}^k A\|_2{}^F$" should read -- $e=\left\|A - U_k U_k^T A\right\|_F^2$ --.

Line 30, "$\|A\|_2{}^F$" should read -- $\|A\|_F^2$ --

Column 22,
Line 4, "if" should read -- is --.

Column 26,
Line 1, "diffuise" should read -- diffuse --.

Column 29,
Line 12, "by reference" should read -- by a reference --.
Line 35, "sequence" should read -- sequences --.
Line 50, "video sequence" should read -- video sequences --.

Column 30,
Line 39, "video sequence" should read -- video sequences --.
Line 40, "22 each" should read -- 22 wherein each --.

Signed and Sealed this

Twenty-seventh Day of November, 2001

Attest:

*Attesting Officer*

NICHOLAS P. GODICI
*Acting Director of the United States Patent and Trademark Office*